United States Patent
Xu et al.

(10) Patent No.: US 11,729,667 B2
(45) Date of Patent: Aug. 15, 2023

(54) ETHERNET DATA-BASED COMMUNICATION METHOD AND APPARATUS

(71) Applicant: Huawei Technologies Co., Ltd., Shenzhen (CN)

(72) Inventors: Xiaoying Xu, Shanghai (CN); Qufang Huang, Shenzhen (CN); Xing Liu, Shenzhen (CN); Qinghai Zeng, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 17/214,791

(22) Filed: Mar. 26, 2021

(65) Prior Publication Data

US 2021/0219175 A1 Jul. 15, 2021

Related U.S. Application Data

(63) Continuation of application No. PCT/CN2019/108016, filed on Sep. 26, 2019.

(30) Foreign Application Priority Data

Sep. 28, 2018 (CO) .......................... 201811142740.3

(51) Int. Cl.
*H04W 28/06* (2009.01)
*H04L 45/74* (2022.01)
(Continued)

(52) U.S. Cl.
CPC ........... *H04W 28/06* (2013.01); *H04L 5/0053* (2013.01); *H04L 12/28* (2013.01);
(Continued)

(58) Field of Classification Search
CPC ...... H04W 28/06; H04W 72/23; H04L 45/74; H04L 69/04; H04L 12/40169; H04L 5/0053; H04L 69/324; H04L 12/28
(Continued)

(56) References Cited

U.S. PATENT DOCUMENTS

2006/0227747 A1 10/2006 Kim et al.
2016/0142518 A1* 5/2016 Raina ...................... H04L 69/04
370/230

(Continued)

FOREIGN PATENT DOCUMENTS

CA 3021658 A1 * 4/2019 ............. H04L 69/04
CN 102025737 A 4/2011
(Continued)

OTHER PUBLICATIONS

Wu et al., "On Efficient Packet-Switched Wireless Networking: A Markovian Approach to Trans-Layer Design and Optimization of ROHC," IEEE Transactions on Wireless Communications, vol. 16, No. 7, pp. 4232-4245, Institute of Electrical and Electronics Engineers, New York, New York (Jul. 2017).
(Continued)

*Primary Examiner* — Omar J Ghowrwal
(74) *Attorney, Agent, or Firm* — Leydig, Voit & Mayer, Ltd.

(57) ABSTRACT

This application provides an Ethernet data-based communication method and apparatus. The method includes: receiving, by a terminal device from a network device, a parameter used to indicate a first Ethernet compression capability; generating a first Ethernet packet based on the parameter of the first Ethernet compression capability; and sending the first Ethernet packet to the network device. Therefore, not only a manner in which the network device enables the terminal device to use an Ethernet compression
(Continued)

capability is proposed, but also the terminal device and the network device can transmit compressed Ethernet data in a wireless network, thereby effectively saving resources.

20 Claims, 10 Drawing Sheets

(51) Int. Cl.
*H04L 69/04* (2022.01)
*H04L 12/40* (2006.01)
*H04L 5/00* (2006.01)
*H04L 12/28* (2006.01)
*H04W 72/23* (2023.01)
*H04L 69/324* (2022.01)

(52) U.S. Cl.
CPC ........ *H04L 12/40169* (2013.01); *H04L 45/74* (2013.01); *H04L 69/04* (2013.01); *H04W 72/23* (2023.01); *H04L 69/324* (2013.01)

(58) Field of Classification Search
USPC ........................................................ 370/230
See application file for complete search history.

(56) References Cited

U.S. PATENT DOCUMENTS

| | | | |
|---|---|---|---|
| 2017/0262650 A1* | 9/2017 | Patel | H04L 63/0884 |
| 2018/0213065 A1 | 7/2018 | Pang et al. | |
| 2021/0243647 A1* | 8/2021 | Tang | H04L 69/04 |
| 2022/0166854 A1* | 5/2022 | Fan | H04L 69/22 |

FOREIGN PATENT DOCUMENTS

| | | |
|---|---|---|
| CN | 102197629 A | 9/2011 |
| CN | 102457901 A | 5/2012 |
| CN | 102546547 A | 7/2012 |
| CN | 103415841 A | 11/2013 |
| CN | 104079488 A | 10/2014 |
| CN | 105101108 A | 11/2015 |
| CN | 105812094 A | 7/2016 |
| CN | 107347046 A | 11/2017 |
| CN | 108200091 A | 6/2018 |
| JP | 2004509566 A | 3/2004 |
| JP | 2005509381 A | 4/2005 |
| JP | 2010529701 A | 8/2010 |
| WO | 2018024940 A1 | 2/2018 |

OTHER PUBLICATIONS

Nokia et al., "NR-URLLC for Rel-16: Email discussion summary," RAN # 80, La Jolla, CA, US, RP-180973, total 10 pages (Jun. 11-14, 2018).

Ericsson, "On the scope of study for NR Industrial IoT study," 3GPP TSG-RAN #81, Gold Coast, Australia, Tdoc RP-181882, total 3 pages (Sep. 10-13, 2018).

Nokia et al., "New SID on NR Industrial IoT," 3GPP TSG-RAN#80, La Jolla, US, RP-181479, total 5 pages, 3rd Generation Partnership Project, Valbonne, France (Jun. 11-14, 2018).

"Draft Standard for Local and metropolitan area networks—Bridges and Bridged Networks," 802.1Q-REV/D2.2, total 1865 pages, Institute of Electrical and Electronics Engineers, New York, New York (Jul. 30, 2014).

"3rd Generation Partnership Project; Technical Specification Group Radio Access Network; Evolved Universal Terrestrial Radio Access (E-UTRA); Packet Data Convergence Protocol (PDCP) specification (Release 15)," 3GPP TS 36.323 V15.0.0, total 51 pages, 3rd Generation Partnership Project, Valbonne, France (Jul. 2018).

"3rd Generation Partnership Project; Technical Specification Group Services and System Aspects; Service requirements for the 5G system; Stage 1 (Release 16)," 3GPP TS 22.261 V16.5.0, total 67 pages, 3rd Generation Partnership Project, Valbonne, France (Sep. 2018).

"3rd Generation Partnership Project; Technical Specification Group Radio Access Network; Evolved Universal Terrestrial Radio Access (E-UTRA); Radio Resource Control (RRC); Protocol specification (Release 15)," 3GPP TS 36.331 V15.3.0, total 918 pages, 3rd Generation Partnership Project, Valbonne, France (Sep. 2018).

"3rd Generation Partnership Project; Technical Specification Group Services and System Aspects; Study on Communication for Automation in Vertical Domains (Release 16)," 3GPP TR 22.804 V16.1.0, total 189 pages, 3rd Generation Partnership Project, Valbonne, France (Sep. 2018).

"3rd Generation Partnership Project; Technical Specification Group Radio Access Network; NR; Packet Data Convergence Protocol (PDCP) specification (Release 15)," 3GPP TS 38.323 V15.3.0, total 26 pages, 3rd Generation Partnership Project, Valbonne, France (Sep. 2018).

"3rd Generation Partnership Project; Technical Specification Group Radio Access Network; NR; Radio Resource Control (RRC) protocol specification (Release 15)," 3GPP TS 38.331 V15.3.0, total 445 pages, 3rd Generation Partnership Project, Valbonne, France (Sep. 2018).

* cited by examiner

ETHERNET DATA-BASED COMMUNICATION METHOD AND APPARATUS

CROSS-REFERENCE TO RELATED APPLICATIONS

This application is a continuation of International Application No. PCT/CN2019/108016, filed on Sep. 26, 2019, which claims priority to Chinese Patent Application No. 201811142740.3, filed on Sep. 28, 2018. The disclosures of the aforementioned applications are hereby incorporated by reference in their entireties.

TECHNICAL FIELD

Embodiments of this application relate to the communications field, and more specifically, to an Ethernet data-based communication method and apparatus.

BACKGROUND

Ethernet is a local area network communications technology. Currently, wired Ethernet is used to transmit data in an industrial scenario. Herein, data transmitted based on an Ethernet communications technology may be referred to as Ethernet data for short. In addition, rapid development of wireless communications provides infinite possibilities for the flexibility, mobility, diversity, and remodeling of transmission in factories in the future. Therefore, in the industrial scenario, Ethernet data may also be transmitted through wireless communication. For example, a console sends an instruction to a machine device through a wireless network, and the machine device performs a corresponding action according to the received instruction and reports status information of the machine device to a server.

Therefore, how to transmit Ethernet data in a wireless network has become an urgent problem to be resolved.

SUMMARY

Embodiments of this application provide an Ethernet data-based communication method and apparatus.

According to a first aspect, an Ethernet data-based communication method is provided, including: A terminal device receives compression configuration information from a network device, where the compression configuration information is used to indicate a parameter of a first Ethernet compression capability. The terminal device generates a first Ethernet packet based on the parameter of the first Ethernet compression capability. The terminal device sends the first Ethernet packet to the network device.

Therefore, according to the method for processing Ethernet data provided in this embodiment of this application, the network device configures an Ethernet compression capability for the terminal device. In addition, the terminal device compresses Ethernet data based on the Ethernet compression capability configured by the network device, and sends a compressed packet to the network device. A manner in which the network device enables the terminal device to use the Ethernet compression capability is proposed. In addition, the terminal device and the network device can transmit the compressed Ethernet data in a wireless network, to effectively save resources.

With reference to the first aspect, in some implementations of the first aspect, the method further includes: The terminal device sends compression capability information to the network device, where the compression capability information is used to indicate N Ethernet compression capabilities supported by the terminal device, the N Ethernet compression capabilities include the first Ethernet compression capability, and N is an integer greater than or equal to 1.

Therefore, according to the method for processing Ethernet data provided in this embodiment of this application, the terminal device reports the Ethernet compression capability of the terminal device to the network device, and the network device configures one or more Ethernet compression capabilities for the terminal device based on the Ethernet compression capability of the terminal device, so that the Ethernet compression capability supported by the terminal device can be effectively configured for the terminal device.

With reference to the first aspect, in some implementations of the first aspect, the parameter of the first Ethernet compression capability includes an enabling parameter, and the enabling parameter is used to indicate the terminal device to use the first Ethernet compression capability.

With reference to the first aspect, in some implementations of the first aspect, the parameter of the first Ethernet compression capability includes a frame format parameter used to indicate a first frame format or an algorithm parameter used to indicate a compression algorithm of a first frame format, and the first frame format is a frame format of the first Ethernet packet.

With reference to the first aspect, in some implementations of the first aspect, the first Ethernet packet includes a first header, the first header includes a first context identifier, and the first context identifier is used to identify first context information.

Therefore, in this embodiment of this application, a context identifier used to identify context information is added to a header of an Ethernet packet, so that the network device further obtains the corresponding context information by using the context identifier, to effectively ensure that the network device successfully decompresses the Ethernet packet.

With reference to the first aspect, in some implementations of the first aspect, the method further includes: The terminal device sends a first correspondence between the first context identifier and the first context information to the network device.

With reference to the first aspect, in some implementations of the first aspect, the method further includes: The terminal device sends a second Ethernet packet to the network device, where the second Ethernet packet includes a second header, and the second header includes the first correspondence.

In this way, an uncompressed Ethernet packet (for example, the second Ethernet packet) carries a correspondence, to reduce signaling overheads, and save resources.

With reference to the first aspect, in some implementations of the first aspect, the second header further includes a frame format of the second Ethernet packet, and the frame format of the second Ethernet packet is the same as the frame format of the first Ethernet packet.

In this way, a system can create at least one context identifier for each frame format, and context information is identified in each frame format, to reduce a quantity of bits occupied by the context identifier.

With reference to the first aspect, in some implementations of the first aspect, the method further includes: The terminal device sends a correspondence between a context identifier and context information to the network device, where the correspondence includes the first correspondence.

With reference to the first aspect, in some implementations of the first aspect, the method further includes: The terminal device receives first feedback information from the network device, where the first feedback information is used to indicate that the network device successfully receives the first correspondence.

With reference to the first aspect, in some implementations of the first aspect, the first feedback information includes the first context identifier.

With reference to the first aspect, in some implementations of the first aspect, the method further includes: The terminal device receives second feedback information from the network device, where the second feedback information is used to indicate that the network device successfully decompresses the first Ethernet packet.

According to a second aspect, another Ethernet data-based communication method is provided, including: A network device sends compression configuration information to a terminal device, where the compression configuration information is used to indicate a parameter of a first Ethernet compression capability. The network device receives a first Ethernet packet, where the first Ethernet packet is generated based on the parameter of the first Ethernet compression capability. The network device decompresses the first Ethernet packet.

Therefore, according to the method for processing Ethernet data provided in this embodiment of this application, the network device configures an Ethernet compression capability for the terminal device. In addition, the terminal device compresses Ethernet data based on the Ethernet compression capability configured by the network device, and sends a compressed packet to the network device. A manner in which the network device enables the terminal device to use the Ethernet compression capability is proposed. In addition, the terminal device and the network device can transmit the compressed Ethernet data in a wireless network, to effectively save resources.

With reference to the second aspect, in some implementations of the second aspect, the method further includes: The network device receives compression capability information from the terminal device, where the compression capability information is used to indicate N Ethernet compression capabilities supported by the terminal device, the N Ethernet compression capabilities include the first Ethernet compression capability, and N is an integer greater than or equal to 1.

With reference to the second aspect, in some implementations of the second aspect, the parameter of the first Ethernet compression capability includes a frame format parameter used to indicate a first frame format and/or an algorithm parameter used to indicate a compression algorithm of the first frame format, and the first frame format is a frame format of the first Ethernet packet.

With reference to the second aspect, in some implementations of the second aspect, the first Ethernet packet includes a first header, the first header includes a first context identifier, and the first context identifier is used to identify first context information. The method further includes: The network device obtains the first context information based on the first context identifier. That the network device decompresses the first Ethernet packet includes: The network device decompresses the first Ethernet packet based on the first context information.

Therefore, in this embodiment of this application, a context identifier used to identify context information is added to a header of an Ethernet packet, so that the network device further obtains the corresponding context information by using the context identifier, to effectively ensure that the network device successfully decompresses the Ethernet packet.

With reference to the second aspect, in some implementations of the second aspect, the method further includes: The network device receives a first correspondence between the first context identifier and the first context information from the terminal device.

With reference to the second aspect, in some implementations of the second aspect, the method further includes: The network device receives a second Ethernet packet from the terminal device, where the second Ethernet packet includes a second header, and the second header includes the first correspondence.

In this way, an uncompressed Ethernet packet (for example, the second Ethernet packet) carries a correspondence, to reduce signaling overheads, and save resources.

With reference to the second aspect, in some implementations of the second aspect, the second header further includes a frame format of the second Ethernet packet, and the frame format of the second Ethernet packet is the same as the frame format of the first Ethernet packet.

In this way, the second header further includes the frame format of the second Ethernet packet, so that a system can create at least one context identifier for each frame format, and context information is identified in each frame format, to reduce a quantity of bits occupied by the context identifier.

With reference to the second aspect, in some implementations of the second aspect, the method further includes: The network device receives a correspondence between a context identifier and context information from the terminal device, where the correspondence includes the first correspondence.

With reference to the second aspect, in some implementations of the second aspect, the method further includes: The network device sends first feedback information to the terminal device, where the first feedback information is used to indicate that the network device successfully receives the first correspondence.

With reference to the second aspect, in some implementations of the second aspect, the first feedback information includes the first context identifier.

With reference to the second aspect, in some implementations of the second aspect, the method further includes: The network device sends second feedback information to the terminal device, where the second feedback information is used to indicate that the network device successfully decompresses the first Ethernet packet.

According to a third aspect, another Ethernet data-based communication method is provided, including: A terminal device receives compression configuration information from a network device, where the compression configuration information is used to indicate a parameter of a third Ethernet compression capability. The terminal device receives a third Ethernet packet from the network device, where the third Ethernet packet is generated based on the parameter of the third Ethernet compression capability. The terminal device decompresses the third Ethernet packet.

With reference to the third aspect, in some implementations of the third aspect, the method further includes: The terminal device sends compression capability information to the network device, where the compression capability information is used to indicate N Ethernet compression capabilities supported by the terminal device, the N Ethernet compression capabilities include the third Ethernet compression capability, and N is an integer greater than or equal to 1.

With reference to the third aspect, in some implementations of the third aspect, the parameter of the third Ethernet compression capability includes an enabling parameter, and the enabling parameter is used to indicate the terminal device to use the third Ethernet compression capability.

With reference to the third aspect, in some implementations of the third aspect, the parameter of the third Ethernet compression capability includes a frame format parameter used to indicate a third frame format or an algorithm parameter used to indicate a compression algorithm of a third frame format, and the third frame format is a frame format of the third Ethernet packet.

With reference to the third aspect, in some implementations of the third aspect, the third Ethernet packet includes a third header, the third header includes a third context identifier, and the third context identifier is used to identify third context information. The method further includes: The terminal device obtains the third context information based on the third context identifier. That the terminal device decompresses the third Ethernet packet includes: The terminal device decompresses the third Ethernet packet based on the third context information.

With reference to the third aspect, in some implementations of the third aspect, the method further includes: The terminal device receives a third correspondence between the third context identifier and the third context information from the network device.

With reference to the third aspect, in some implementations of the third aspect, the method further includes: The terminal device receives a fourth Ethernet packet from the network device, where the fourth Ethernet packet includes a fourth header, and the fourth header includes the third correspondence.

With reference to the third aspect, in some implementations of the third aspect, the fourth header further includes a frame format of the fourth Ethernet packet, and the frame format of the fourth Ethernet packet is the same as the frame format of the third Ethernet packet.

With reference to the third aspect, in some implementations of the third aspect, the method further includes: The terminal device receives a correspondence between a context identifier and context information from the network device, where the correspondence includes the third correspondence.

With reference to the third aspect, in some implementations of the third aspect, the method further includes: The terminal device sends third feedback information to the network device, where the third feedback information is used to indicate that the terminal device successfully receives the third correspondence.

With reference to the third aspect, in some implementations of the third aspect, the third feedback information includes the third context identifier.

With reference to the third aspect, in some implementations of the third aspect, the method further includes: The terminal device sends fourth feedback information to the network device, where the fourth feedback information is used to indicate that the terminal device successfully decompresses the third Ethernet packet.

According to a fourth aspect, an Ethernet data-based communication method is provided, including: A network device sends compression configuration information to a terminal device, where the compression configuration information is used to indicate a parameter of a third Ethernet compression capability. The network device generates a third Ethernet packet based on the parameter of the third Ethernet compression capability. The network device sends the third Ethernet packet to the terminal device.

With reference to the fourth aspect, in some implementations of the fourth aspect, the method further includes: The network device receives compression capability information from the terminal device, where the compression capability information is used to indicate N Ethernet compression capabilities supported by the terminal device, the N Ethernet compression capabilities include the third Ethernet compression capability, and N is an integer greater than or equal to 1.

With reference to the fourth aspect, in some implementations of the fourth aspect, the parameter of the third Ethernet compression capability includes an enabling parameter, and the enabling parameter is used to indicate the terminal device to use the third Ethernet compression capability.

With reference to the fourth aspect, in some implementations of the fourth aspect, the parameter of the third Ethernet compression capability includes a frame format parameter used to indicate a third frame format and/or an algorithm parameter used to indicate a compression algorithm of the third frame format, and the third frame format is a frame format of the third Ethernet packet.

With reference to the fourth aspect, in some implementations of the fourth aspect, the third Ethernet packet includes a third header, the third header includes a third context identifier, and the third context identifier is used to identify third context information.

With reference to the fourth aspect, in some implementations of the fourth aspect, the method further includes: The network device sends a third correspondence between the third context identifier and the third context information to the terminal device.

With reference to the fourth aspect, in some implementations of the fourth aspect, the method further includes: The network device sends a fourth Ethernet packet to the terminal device, where the fourth Ethernet packet includes a fourth header, and the fourth header includes the third correspondence.

With reference to the fourth aspect, in some implementations of the fourth aspect, the fourth header further includes a frame format of the fourth Ethernet packet, and the frame format of the fourth Ethernet packet is the same as the frame format of the third Ethernet packet.

With reference to the fourth aspect, in some implementations of the fourth aspect, the method further includes: The network device sends a correspondence between a context identifier and context information to the terminal device, where the correspondence includes the third correspondence.

With reference to the fourth aspect, in some implementations of the fourth aspect, the method further includes: The network device receives third feedback information from the terminal device, where the third feedback information is used to indicate that the terminal device successfully receives the third correspondence.

With reference to the fourth aspect, in some implementations of the fourth aspect, the third feedback information includes the third context identifier.

With reference to the fourth aspect, in some implementations of the fourth aspect, the method further includes: The network device receives fourth feedback information from the terminal device, where the fourth feedback information is used to indicate that the terminal device successfully decompresses the third Ethernet packet.

According to a fifth aspect, another Ethernet data-based communication method is provided, including: A transmit end generates a fifth Ethernet packet, where the fifth Ethernet packet includes a fifth header, the fifth header includes a fifth context identifier, and the fifth context identifier is used to identify fifth context information. The transmit end sends the fifth Ethernet packet to a receive end.

With reference to the fifth aspect, in some implementations of the fifth aspect, the method further includes: The transmit end sends a correspondence between a context identifier and context information to the receive end, where the correspondence includes a fifth correspondence between the fifth context identifier and the fifth context information.

With reference to the fifth aspect, in some implementations of the fifth aspect, the method further includes: The transmit end sends a sixth Ethernet packet to the receive end, where the sixth Ethernet packet includes a sixth header, and the sixth header includes the correspondence between the fifth context identifier and fifth context information.

With reference to the fifth aspect, in some implementations of the fifth aspect, the sixth header further includes indication information used to indicate a frame format of the sixth Ethernet packet, and the frame format of the sixth Ethernet packet is the same as a frame format of the fifth Ethernet packet.

With reference to the fifth aspect, in some implementations of the fifth aspect, the method further includes: The transmit end receives fifth feedback information from the receive end, where the fifth feedback information is used to indicate that the receive end successfully receives the correspondence.

With reference to the fifth aspect, in some implementations of the fifth aspect, the fifth feedback information includes the context identifier in the correspondence.

With reference to the fifth aspect, in some implementations of the fifth aspect, the method further includes: The transmit end receives sixth feedback information from the receive end, where the sixth feedback information is used to indicate that the receive end successfully decompresses the fifth Ethernet packet.

With reference to the fifth aspect, in some implementations of the fifth aspect, the transmit end is a terminal device, and the receive end is a network device. The method further includes: The transmit end receives compression configuration information from the receive end, where the compression configuration information is used to indicate a parameter of a fifth Ethernet compression capability. That the transmit end generates a fifth Ethernet packet includes: The transmit end generates the fifth Ethernet packet based on the parameter of the fifth Ethernet compression capability.

With reference to the fifth aspect, in some implementations of the fifth aspect, the method further includes: The transmit end sends compression capability information to the receive end, where the compression capability information is used to indicate N Ethernet compression capabilities supported by the transmit end, the N Ethernet compression capabilities include the fifth Ethernet compression capability, and N is an integer greater than or equal to 1.

With reference to the fifth aspect, in some implementations of the fifth aspect, the transmit end is a network device, and the receive end is a terminal device. The method further includes: The transmit end sends compression configuration information to the receive end, where the compression configuration information is used to indicate a parameter of a fifth Ethernet compression capability. That the transmit end generates a fifth Ethernet packet includes: The transmit end generates the fifth Ethernet packet based on the parameter of the fifth Ethernet compression capability.

With reference to the fifth aspect, in some implementations of the fifth aspect, the method further includes: The transmit end receives compression capability information from the receive end, where the compression capability information is used to indicate N Ethernet compression capabilities supported by the receive end, the N Ethernet compression capabilities include the fifth Ethernet compression capability, and N is an integer greater than or equal to 1.

According to a sixth aspect, another Ethernet data-based communication method is provided, including: A receive end receives a fifth Ethernet packet, where the fifth Ethernet packet includes a fifth header, the fifth header includes a fifth context identifier, and the fifth context identifier is used to identify fifth context information. The receive end obtains the fifth context information based on the fifth context identifier. The receive end decompresses the fifth Ethernet packet based on the fifth context information.

With reference to the sixth aspect, in some implementations of the sixth aspect, the method further includes: The receive end receives a correspondence between a context identifier and context information, where the correspondence includes a fifth correspondence between the fifth context identifier and the fifth context information. That the receive end obtains the fifth context information based on the fifth context identifier includes: The receive end obtains the fifth context information based on the fifth context identifier and the fifth correspondence.

With reference to the sixth aspect, in some implementations of the sixth aspect, the method further includes: The receive end receives a sixth Ethernet packet, where the sixth Ethernet packet includes a sixth header, and the sixth header includes the correspondence between the fifth context identifier and the fifth context information. That the receive end obtains the fifth context information based on the fifth context identifier includes: The receive end obtains the fifth context information based on the fifth context identifier and the fifth correspondence.

With reference to the sixth aspect, in some implementations of the sixth aspect, the sixth header further includes indication information used to indicate a frame format of the sixth Ethernet packet, and the frame format of the sixth Ethernet packet is the same as a frame format of the fifth Ethernet packet.

With reference to the sixth aspect, in some implementations of the sixth aspect, the method further includes: The receive end sends fifth feedback information, where the fifth feedback information is used to indicate that the receive end successfully receives the correspondence.

With reference to the sixth aspect, in some implementations of the sixth aspect, the fifth feedback information includes the context identifier in the correspondence.

With reference to the sixth aspect, in some implementations of the sixth aspect, the method further includes: The receive end sends sixth feedback information, where the sixth feedback information is used to indicate that the receive end successfully decompresses the fifth Ethernet packet.

With reference to the sixth aspect, in some implementations of the sixth aspect, the receive end is a network device, and the transmit end is a terminal device. The method further includes: The receive end sends compression configuration information to the transmit end, where the compression configuration information is used to indicate a parameter of a fifth Ethernet compression capability, and the fifth Ethernet packet is generated based on the parameter of the fifth Ethernet compression capability.

With reference to the sixth aspect, in some implementations of the sixth aspect, the method further includes: The receive end receives compression capability information from the transmit end, where the compression capability information is used to indicate N Ethernet compression capabilities supported by the transmit end, the N Ethernet compression capabilities include the fifth Ethernet compression capability, and N is an integer greater than or equal to 1.

With reference to the sixth aspect, in some implementations of the sixth aspect, the receive end is a terminal device, and the transmit end is a network device. The method further includes: The receive end receives compression configuration information from the transmit end, where the compression configuration information is used to indicate a parameter of a fifth Ethernet compression capability, and the fifth Ethernet packet is generated based on the parameter of the fifth Ethernet compression capability.

With reference to the sixth aspect, in some implementations of the sixth aspect, the method further includes: The receive end receives compression capability information from the transmit end, where the compression capability information is used to indicate N Ethernet compression capabilities supported by the transmit end, the N Ethernet compression capabilities include the fifth Ethernet compression capability, and N is an integer greater than or equal to 1.

According to a seventh aspect, another Ethernet data-based communication method is provided, including: An access network device receives an Ethernet packet sent by a core network device in a common quality of service QoS flow. The access network device sends the Ethernet packet through broadcast or multicast.

According to an eighth aspect, an Ethernet data-based apparatus is provided, configured to perform the method in any possible implementation of any one of the foregoing aspects. Specifically, the apparatus includes units configured to perform the method in any possible implementation of any one of the foregoing aspects.

According to a ninth aspect, another Ethernet data-based apparatus is provided. The apparatus includes a transceiver, a memory, and a processor. The transceiver, the memory, and the processor communicate with each other through an internal connection channel. The memory is configured to store an instruction. The processor is configured to execute the instruction stored in the memory, to control a receiver to receive a signal, and control a transmitter to send a signal. In addition, when the processor executes the instruction stored in the memory, the processor is enabled to perform the method in any possible implementation of any one of the foregoing aspects.

According to a tenth aspect, a computer program product is provided. The computer program product includes computer program code. When the computer program code is run on a computer, the computer is enabled to perform the methods in the foregoing aspects.

According to an eleventh aspect, a computer readable medium is provided, configured to store a computer program. The computer program includes an instruction used to perform the methods in the foregoing aspects.

According to a twelfth aspect, a chip is provided, including a processor. The processor is configured to invoke an instruction stored in the memory and run the instruction, to enable a communications device on which the chip is installed to perform the methods in the foregoing aspects.

According to a thirteenth aspect, another chip is provided, including an input interface, an output interface, a processor, and a memory. The input interface, the output interface, the processor, and the memory are connected through an internal connection path. The processor is configured to execute code in the memory. When the code is executed, the processor is configured to perform the methods in the foregoing aspects.

DESCRIPTION OF EMBODIMENTS

Figure 1:
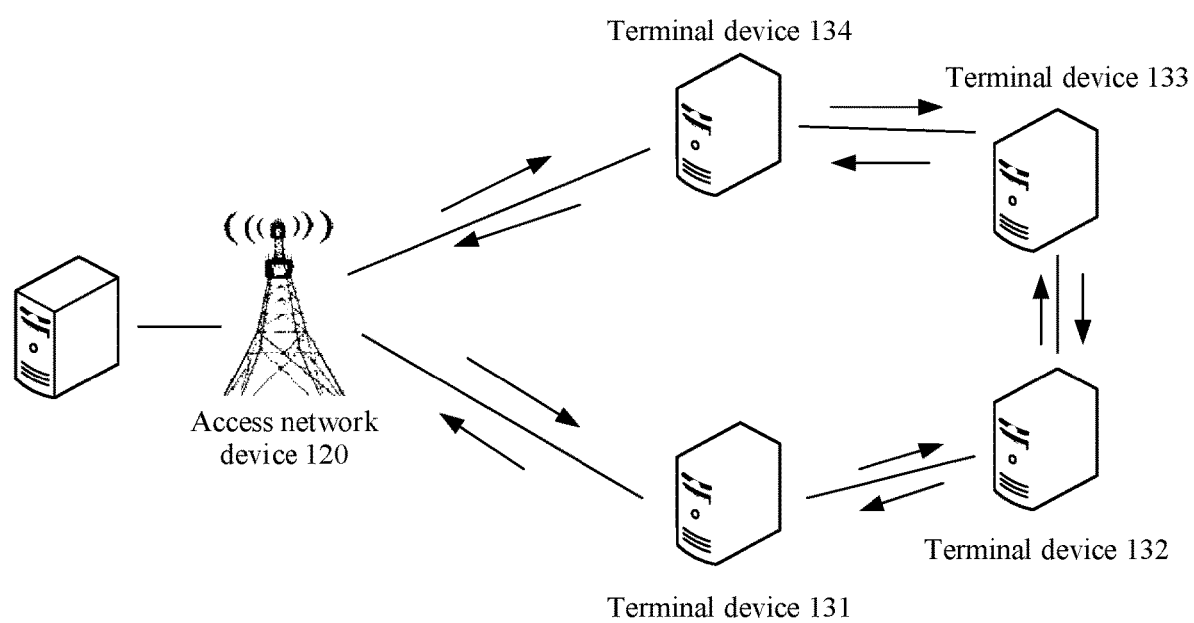
FIG. 1 is a schematic architectural diagram of a mobile communications system to which an embodiment of this application is applicable.

The following describes technical solutions in this application with reference to the accompanying drawings.

The technical solutions of the embodiments of this application may be used in various communications systems, such as a global system for mobile communications (GSM), a code division multiple access (CDMA) system, a wideband code division multiple access (WCDMA) system, a general packet radio service (GPRS) system, a long term evolution (LTE) system, an LTE frequency division duplex (FDD) system, an LTE time division duplex (TDD) system, a universal mobile telecommunications system (UMTS), a worldwide interoperability for microwave access (WIMAX)

communications system, a future 5th generation (5G) system, or a new radio (NR) system.

A network device in the embodiments of this application may be a device configured to communicate with a terminal device. The network device may be a base transceiver station (BTS) in a global system for mobile communications (GSM) system or a code division multiple access (CDMA) system, or may be a NodeB (NB) in a wideband code division multiple access (WCDMA) system, or may be an evolved NodeB (eNB or eNodeB) in an LTE system, or may be a radio controller in a cloud radio access network (CRAN) scenario. Alternatively, the network device may be a relay station, an access point, a vehicle-mounted device, a wearable device, a network device in a future 5G network, a network device in a future evolved public land mobile network (PLMN), or the like. Alternatively, the network device may be a core network device. The core network device may be a control plane and user plane (CU) network element, or may be a control plane function network element (CU-CP) in a CP and UP separation scenario, for example, a session management function (SMF) entity, an access and mobility management function (AMF) network element, or a user plane function (UPF) network element.

The terminal device in the embodiments of this application may be user equipment, an access terminal, a subscriber unit, a subscriber station, a mobile station, a mobile console, a remote station, a remote terminal, a mobile device, a user terminal, a terminal, a wireless communications device, a user agent, a user apparatus, a robot, a manipulator, or the like. This is not limited in the embodiments of this application.

In the embodiments of this application, the terminal device or the network device includes a hardware layer, an operating system layer running above the hardware layer, and an application layer running above the operating system layer. The hardware layer includes hardware such as a central processing unit (CPU), a memory management unit (MMU), and a memory (also referred to as a main memory). The operating system may be any one or more computer operating systems, for example, a LINUX operating system, a UNIX operating system, an ANDROID operating system, an IOS operating system, or a Windows operating system, that process a service through a process. The application layer includes applications such as a browser, an address book, word processing software, and instant communications software. In addition, a specific structure of an execution body of a method provided in the embodiments of this application is not specifically limited in the embodiments of this application provided that a program that records code for the method provided in the embodiments of this application can be run to perform communication according to the method provided in the embodiments of this application. For example, the execution body of the method provided in the embodiments of this application may be the terminal device, the network device, or a function module that can invoke and execute the program in the terminal device or the network device.

In addition, aspects or features of this application may be implemented as a method, an apparatus, or a product that uses standard programming and/or engineering technologies. The term "product" used in this application covers a computer program that can be accessed from any computer readable component, carrier or medium. For example, the computer readable medium may include but is not limited to: a magnetic storage component (for example, a hard disk, a floppy disk, or a magnetic tape), an optical disc (for example, a compact disc (CD) or a digital versatile disc (DVD)), a smart card, and a flash memory component (for example, an erasable programmable read-only memory (EPROM), a card, a stick, or a key drive). In addition, various storage media described in this specification may indicate one or more devices and/or other machine-readable media that are configured to store information. The term "machine-readable media" may include but is not limited to a wireless channel, and various other media that can store, include, and/or carry an instruction and/or data.

FIG. 1 is a schematic architectural diagram of a mobile communications system to which an embodiment of this application is applicable. FIG. 1 shows a mobile communications system in ring networking. The mobile communications system includes a control device 110, an access network device 120, and at least one terminal device (for example, a terminal device 131 to a terminal device 134 in FIG. 1). The terminal device 131 and the terminal device 134 are wirelessly connected to the access network device 120. The terminal device 132 and the terminal device 133 are connected to the access network device 120 through the terminal device 131 and the terminal device 134. In a scenario in which data needs to be transmitted between the access network device 120 and the terminal device 132 or the terminal device 133, the terminal device 131 or the terminal device 134 may be understood as a transit device. For example, if the access network device needs to send downlink data to the terminal device 132, a transmission path of the downlink data may be the access network device 120—the terminal device 131—the terminal device 132, and the terminal device 131 may be understood as a transit device. Alternatively, the transmission path of the downlink data may be the access network device 120—the terminal device 134—the terminal device 133—the terminal device 132, and the terminal device 134 and the terminal device 133 may be understood as transit devices. The access network device 120 is connected to the control device 110 in a wireless or wired manner. The control device 110 and the access network device 120 may be different independent physical devices, a function of the control device 110 and a logical function of the access network device 120 may be integrated into one physical device, or some functions of the control device 110 and some functions of the access network device 120 may be integrated into one physical device. The terminal device may be at a fixed location, or may be movable. FIG. 1 is merely a schematic diagram, and the communications system may further include another network device, for example, may further include a wireless relay device and a wireless backhaul device that are not drawn in FIG. 1. Quantities of control devices, access network devices, and terminal devices included in the mobile communications system are not limited in the embodiments of this application.

Figure 2:
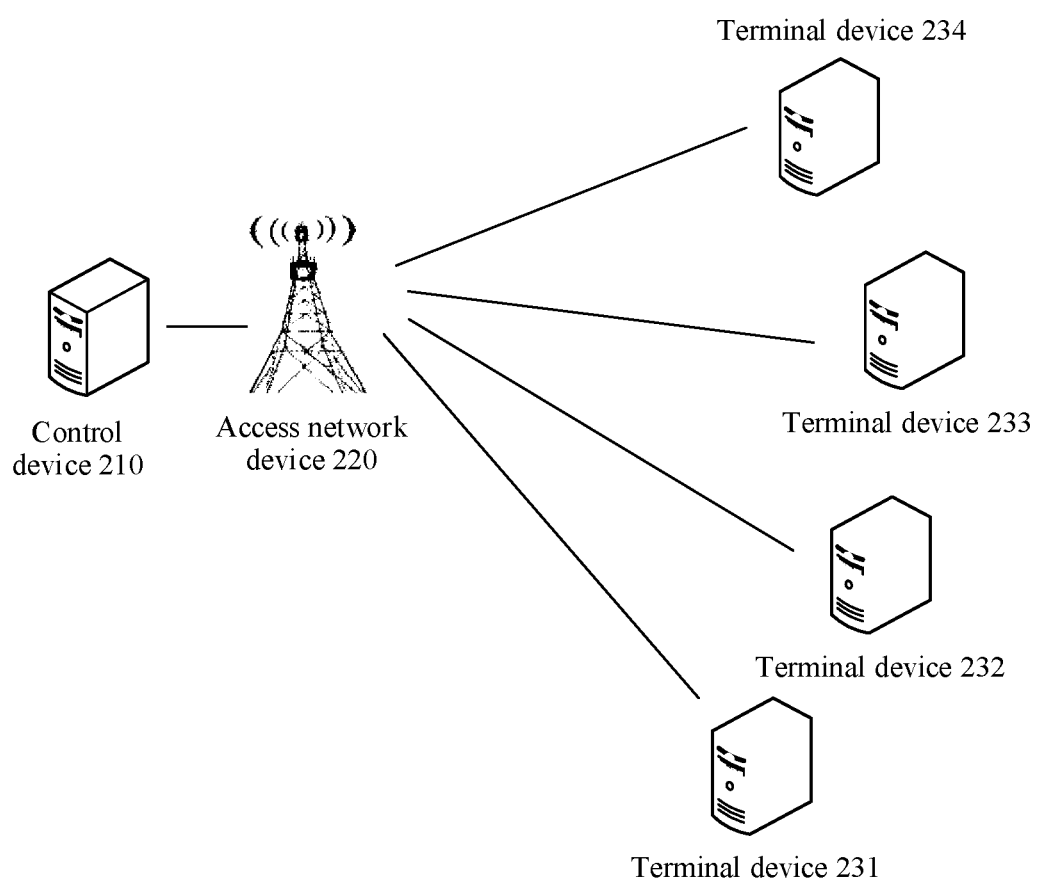
FIG. 2 is another schematic architectural diagram of a mobile communications system to which an embodiment of this application is applicable.

FIG. 2 is another schematic architectural diagram of a mobile communications system to which an embodiment of this application is applicable. FIG. 2 shows a mobile communications system in star networking. The mobile communications system includes a control device 210, an access network device 220, and at least one terminal device (for example, a terminal device 231 to a terminal device 234 in FIG. 2). The access network device 220 is wirelessly connected to any terminal device, and the access network device 220 is connected to the control device 210 in a wireless or wired manner. The control device 210 and the access network device 220 may be different independent physical devices, a function of the control device 210 and a logical function of the access network device 220 may be integrated into one physical device, or some functions of the control device 210 and some functions of the access network device 220 may be integrated into one physical device. The terminal device may be at a fixed location, or may be movable. FIG. 2 is merely a schematic diagram, and the communications system may further include another network device, for example, may further include a wireless relay device and a wireless backhaul device that are not drawn in FIG. 2. Quantities of control devices, access network devices, and terminal devices included in the mobile communications system are not limited in the embodiments of this application.

It should be noted that "at least one" in the embodiments of this application represents "one or more", and the two descriptions may be interchanged.

As described in the background, an objective of the technical solutions provided in the embodiments of this application is to transmit Ethernet data in a wireless network. Based on this, the embodiments of this application mainly describe a method for transmitting Ethernet data in a wireless network from the following four aspects:

A first aspect describes how to compress and process Ethernet data.

A second aspect describes how to transmit broadcast or multicast Ethernet data.

A third aspect describes how a terminal device reports a destination media access control (MAC) address.

A fourth aspect describes how a network device locates and searches for a terminal device.

It should be understood that an embodiment of each of the four aspects may be used independently, and embodiments of any two, three, or four aspects may be combined. This is not limited in the embodiments of this application.

For ease of description, the following first describes the embodiment of each of the foregoing aspects in detail, and then describes the embodiment combining the foregoing two aspects or three aspects and/or four aspects in detail.

The following describes the embodiment in the first aspect in detail with reference to FIG. 3 to FIG. 7.

First, for ease of understanding, an Ethernet frame format is briefly described by using an EtherCAT frame as an example.

Figure 3:
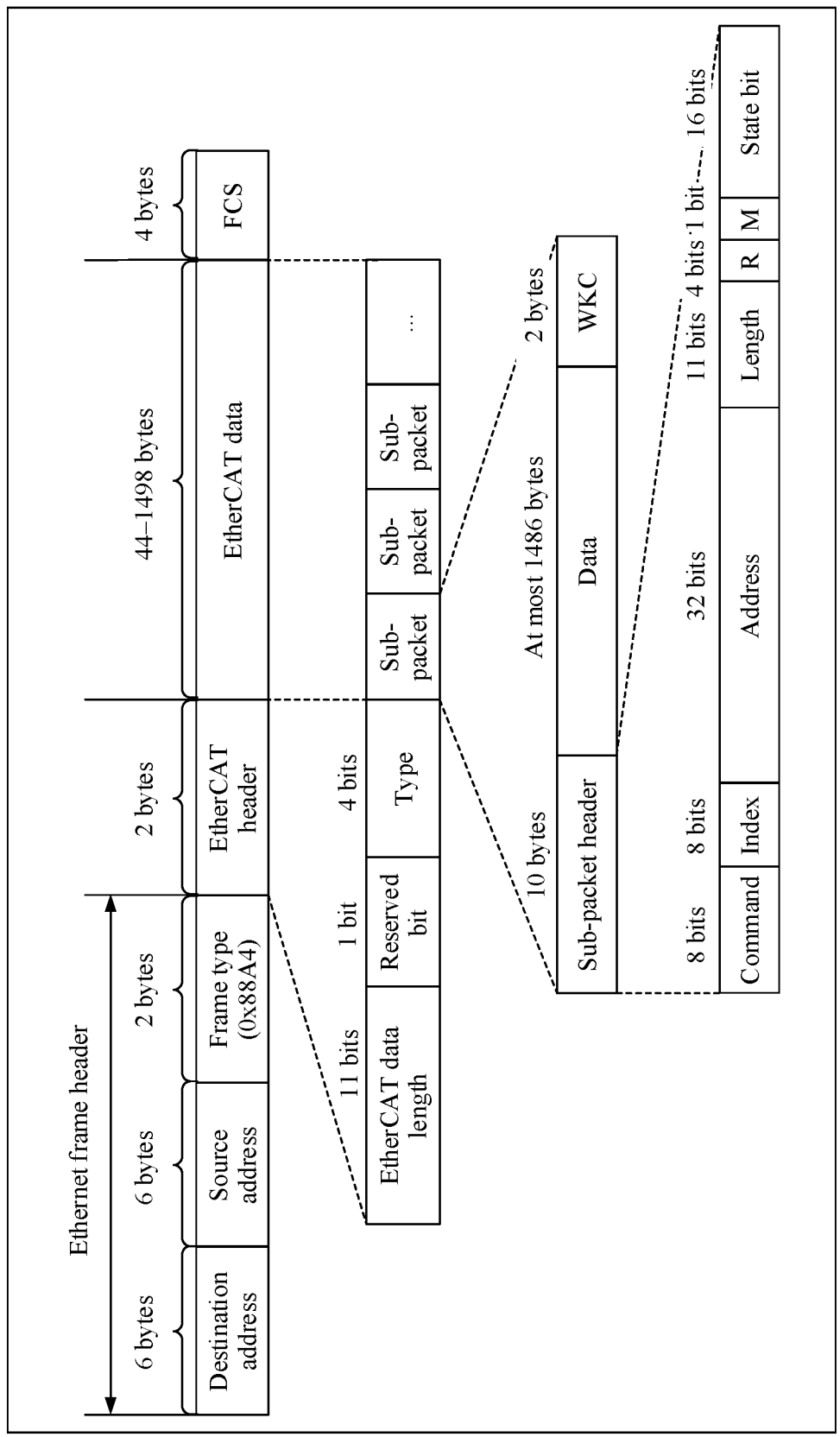
FIG. 3 is a schematic diagram of an EtherCAT frame according to an embodiment of this application.

FIG. 3 is a schematic diagram of an EtherCAT frame. As shown in FIG. 3, a frame format of the EtherCAT frame includes an Ethernet frame header, an EtherCAT header, EtherCAT data, and a frame check sequence (FCS). The Ethernet frame header includes a destination address, a source address, and a frame type. The destination address is a MAC address of a receiver, and the source address is a MAC address of a sender. The MAC address is also referred to as a physical address. The frame type is used to identify an upper-layer protocol included in a data field. The EtherCAT header includes an EtherCAT data length, a reserved bit, and a type. The EtherCAT data includes a 2-byte data header and 44-1498-byte data. The data includes one or more EtherCAT sub-packets, and each sub-packet corresponds to an independent device and a slave-station storage area. The FCS is used to check integrity of a frame during transmission.

Table 1 describes definitions of fields in the Ethernet frame header, Table 2 describes definitions of fields in the EtherCAT header, and Table 3 describes definitions of fields in each sub-packet in the EtherCAT data.

TABLE 1

| Name | Meaning |
| --- | --- |
| Destination address | MAC address of a receiver |
| Source address | MAC address of a sender |
| Frame type | 0x88A4 |

TABLE 2

| Name | Meaning |
| --- | --- |
| EtherCAT data length | Length of EtherCAT data, that is, total length of all sub-packets |
| Type | 1: Communicate with a slave station; other values: reserved |

TABLE 3

| Name | Meaning |
| --- | --- |
| Command | Addressing mode and read/write mode |
| Index | Frame encoding |
| Address | Address of a slave station |
| Length | Length of data in a packet |
| R | Reserved bit |
| M | Flag of a subsequent packet |
| State bit | Interrupt arrival flag |
| Data | Data structure of a sub-packet, user-defined |
| WKC | Working counter |

During point-to-point transmission of a common Ethernet service, there is a large amount of repeatedly transmitted content in a plurality of packets encapsulated in a same frame format. That is, the large amount of repeatedly transmitted content does not change in a plurality of transmissions. For example, the destination address, the source address, the frame type, and fields in the EtherCAT header in the EtherCAT frame shown in FIG. 3 are all repeatedly transmitted content. In addition, a data length may be deduced from information in a payload of a packet, and actually may not need to be transmitted during transmission. In addition, there are 64-bit (8-byte) leading characters at the beginning of an Ethernet frame in each format. The first seven bytes are referred to as a preamble, and include content of a hexadecimal number 0xAA. The last byte is a frame start identifier 0xAB, and represents a start of the Ethernet frame. The leading characters are used to enable the receiver to be synchronized and prepare for receiving the data frame. A 4-byte frame check sequence (FCS) follows variable-length data fields. The frame check sequence is required during transmission in the Ethernet, and does not need to be carried during transmission in a wireless system.

Therefore, in the embodiments of this application, transmission between a terminal device and a network device is used as an example. As an example instead of a limitation, at least one of the following content may be referred to as context information or static information:

content that does not change in packets transmitted between the terminal device and the network device for a plurality of times, or other field information that can be deduced from information in a payload of a packet.

Naturally, compressing Ethernet data described in the embodiments of this application means removing context information from a packet, or compressing Ethernet data means reducing information of a field other than data in an Ethernet packet, to compress the Ethernet data.

It should be understood that an Ethernet packet in the embodiments of this application is a packet carried in an ethertype session. Similarly, Ethernet data is data carried in an ethertype session.

The foregoing briefly describes the Ethernet frame format by using the EtherCAT frame format as an example. The following describes context information in the embodiments of this application based on various different frame formats.

Frame Format 1: Ethernet 802.3 Raw Frame Format

Table 4 shows fields in the Ethernet 802.3 raw frame format. As an example instead of a limitation, context information may include a destination MAC address, a source MAC address, and a type field. A total length is a length of data, may be deduced from the length of the data, and does not need to be carried during transmission.

TABLE 4

| 6 bytes | 6 bytes | 2 bytes | 2 bytes | 44-1498 bytes | 4 bytes |
|---|---|---|---|---|---|
| Destination MAC address | Source MAC address | Total length | 0xFFFF (frame format type) | Data | FCS |

Frame Format 2: Ethernet 802.3 SAP Frame Format

TABLE 5

| 6 bytes | 6 bytes | 2 bytes | 1 byte | 1 byte | 1 byte | 43-1497 bytes | 4 bytes |
|---|---|---|---|---|---|---|---|
| Destination MAC address | Source MAC address | Total length | DSAP | SSAP | Control | Data | FCS |

Table 5 shows fields in the Ethernet 802.3 SAP frame format. In the Ethernet 802.3 SAP frame format, the two-byte 0xFFFF in an Ethernet 802.3 raw frame is changed to the 1-byte DSAP and the 1-byte SSAP, and the 1-byte "control" field is added, to form an 802.2 logical link control (LLC) header. LLC provides a connectionless (LLC type 1) network service and a connection-oriented (LLC type 2) network service. The LLC 1 is used in the Ethernet, and the LLC 2 is used in an IBM system network architecture (SNA) network environment. The newly added 802.2 LLC header includes two service access points: a source service access point (S SAP) and a destination service access point (DSAP). The service access points are used to identify an upper-layer data type carried in an Ethernet frame. For example, a hexadecimal number 0x06 represents IP protocol data, a hexadecimal number 0xE0 represents Novell protocol data, and a hexadecimal number 0xF0 represents IBM NetBIOS protocol data. The 1-byte "control" field is seldom used (generally, the "control" field is set to 0x03, indicating that an 802.2 unnumbered data format in a connectionless service is used).

In the Ethernet 802.3 SAP frame format, as an example instead of a limitation, context information may include the destination MAC address, the source MAC address, the DSAP field, the SSAP field, and the control field. The total length may be deduced from a length of the data, and does not need to be carried, either.

Frame Format 3: Ethernet 802.3 SNAP Frame Format

TABLE 6

| 6 bytes | 6 bytes | 2 bytes | 1 byte | 1 byte | 1 byte | 3 bytes | 2 bytes | 38-1492 bytes | 4 bytes |
|---|---|---|---|---|---|---|---|---|---|
| Destination MAC address | Source MAC address | Total length | 0 × AA | 0 × AA | 0 × 03 | OUI ID | Type | Data | FCS |

Table 6 shows fields in the Ethernet 802.3 SNAP frame format. The differences between the Ethernet 802.3 SNAP frame format and the Ethernet 802.3 SAP frame format are as follows:

First, the two-byte DSAP and SSAP fields are set to a fixed hexadecimal number 0xAA.

Second, the content of the 1-byte "control" field is set to a fixed hexadecimal number 0x03.

Third, an SNAP field is added, and includes the following two parts:

the 3-byte organizationally unique identifier (OUI ID) field is added, and a value of the field is usually equal to the first three bytes of a MAC address, that is, code of a network adapter vendor; and the 2-byte "type" field is used to identify a type of upper-layer data carried in the Ethernet frame.

In the Ethernet 802.3 SNAP frame format, as an example instead of a limitation, context information may include the destination MAC address, the source MAC address, the DSAP and SSAP field, the control field, the OUI ID field, and the type field.

Frame Format 4: Ethernet II Frame Format

TABLE 7

| 6 bytes | 6 bytes | 2 bytes | 46-1500 bytes | 4 bytes |
|---|---|---|---|---|
| Destination MAC address | Source MAC address | Type | Data | FCS |

Table 7 shows fields in the Ethernet II frame format. In the Ethernet II frame format, a minimum length is 64 bytes (6+6+2+46+4), and a maximum length is 1518 bytes (6+6+2+1500+4). The first 12 bytes identify a MAC address of a source node that sends a packet and a MAC address of a destination node that receives the packet. The following two bytes identify a type of upper-layer data carried in an Ethernet packet. For example, a hexadecimal number 0x0800 indicates IP protocol data, a hexadecimal number 0x809B indicates AppleTalk protocol data, and a hexadecimal number 0x8138 indicates Novell protocol data.

In the Ethernet II frame format, as an example instead of a limitation, context information may include the destination MAC address, the source MAC address, and the type field.

Frame Format 5: Ethernet Frame Format

Referring to FIG. 3, for a basic EtherCAT frame, context information may include a destination MAC address, a source MAC address, a type field, and a type field of an EtherCAT header. A length field in the EtherCAT header is a length of all sub-packets, and may be deduced from a total length of a packet field.

For a frame format of the basic EtherCAT frame with a virtual local area network (VLAN) tag, as an example instead of a limitation, context information may include a destination MAC address, a source MAC address, a type field, a VLAN tag, and a type field of an EtherCAT header, or context information may include a destination MAC address, a source MAC address, and a type field. It may be understood that, according to implementation optimization, a transmit end may directly delete the VLAN tag, and does not need to store or send the VLAN tag to the receive end as a part of the context information.

For an EtherCAT frame thramitted by using a user datagram protocol (UDP) or an IP, as an example instead of a limitation, context information may include a destination MAC address, a source MAC address, a type field, and a type field of an EetherCAT header.

Frame Format 6: 802.1Q Frame Format

TABLE 8

| 6 bytes | 6 bytes | 4 bytes | 2 bytes | 42-1500 bytes | 4 bytes |
| --- | --- | --- | --- | --- | --- |
| Destination MAC address | Source MAC address | VLAN-1 | Type | Data | FCS |

Table 8 shows fields in the 802.1Q frame format. As an example instead of a limitation, context information may include the destination MAC address, the source MAC address, the VLAN-1 field, and the type field, or the context information may include the destination MAC address, the source MAC address, and the type field.

Frame Format 7: 802.1Q-In-Q Frame Format

TABLE 9

| 6 bytes | 6 bytes | 4 bytes | 4 bytes | 2 bytes | 38-1500 bytes | 4 bytes |
| --- | --- | --- | --- | --- | --- | --- |
| Destination MAC address | Source MAC address | VLAN-1 | VLAN-2 | Type | Data | FCS |

Table 9 shows fields in the 802.1Q-in-Q frame format. As an example instead of a limitation, context information may include the destination MAC address, the source MAC address, the VLAN-1 field, the VLAN-2 field, and the type field, or the context information may include the destination MAC address, the source MAC address, and the type field.

Frame Format 8: 802.3 Frame Format

TABLE 10

| 6 bytes | 6 bytes | 2 bytes | 46-1498 bytes | 4 bytes |
| --- | --- | --- | --- | --- |
| Destination MAC address | Source MAC address | Length/Type | Data | FCS |

Table 10 shows fields in the 802.3 frame format. As an example instead of a limitation, context information may include the destination MAC address, the source MAC address, and the length/type field. A value range of the length field is 0x0000 to 0x05DC, and is variable. If the length field is deducible information, the length field does not need to be carried during transmission. Other values of the field have special meanings, and represent a type of a frame. The field is used as static information, may be used as context information, and does not need to be carried during transmission.

The foregoing describes context information of various different frame formats. It should be understood that the foregoing listed eight frame formats and corresponding context information are merely examples for description, and should not constitute a limitation on the embodiments of this application. Any frame format and corresponding context information fall within the protection scope of the embodiments of this application.

Figure 4:
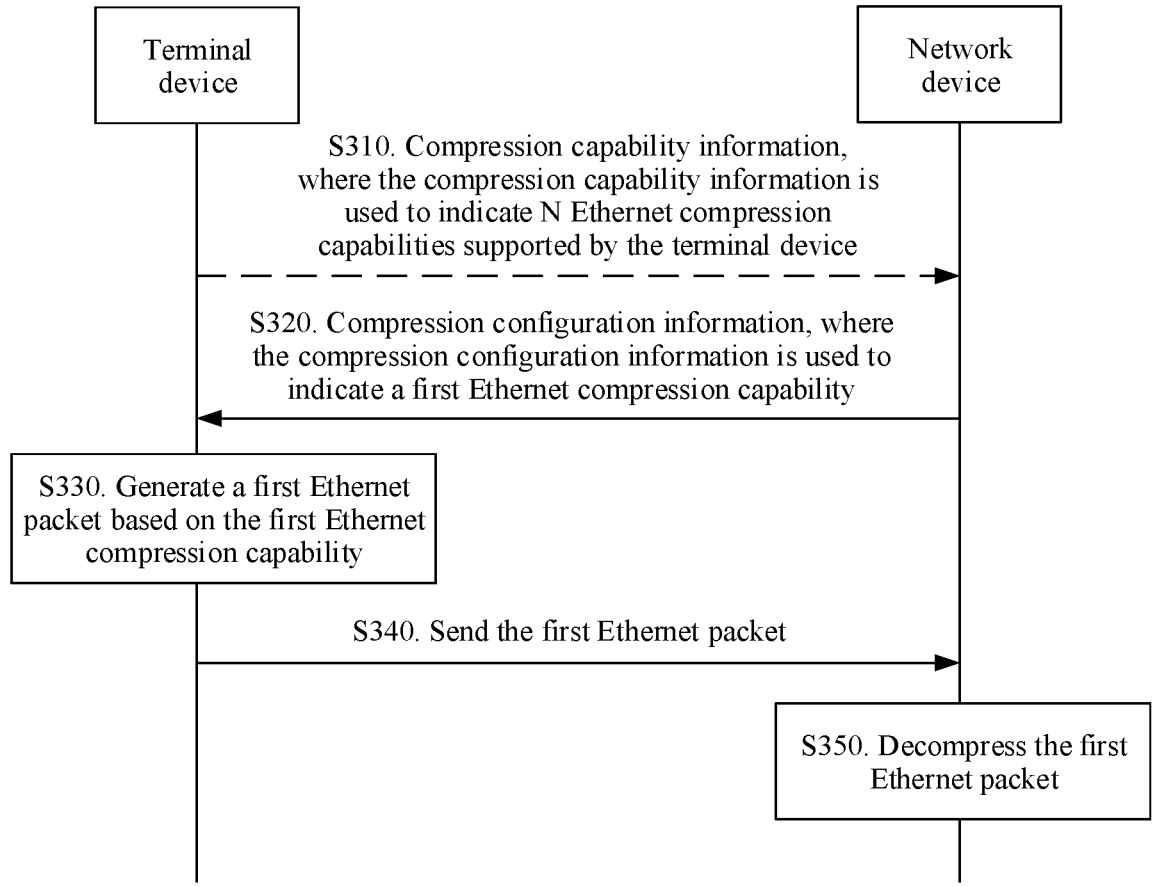
FIG. 4 is a schematic interaction diagram of an Ethernet data-based communication method according to an embodiment of this application.

FIG. 4 is a schematic interaction diagram of an Ethernet data-based communication method 300 according to an embodiment of this application. The method 300 describes how to compress and process Ethernet data from the perspective of uplink transmission.

In this embodiment, a terminal device reports an Ethernet compression capability of the terminal device to a network device, and the network device configures one or more Ethernet compression capabilities for the terminal device based on the Ethernet compression capability of the terminal device. In addition, the terminal device compresses Ethernet data based on the Ethernet compression capability configured by the network device, and sends a compressed packet to the network device.

Each Step of the Method 300 is Described Below.

In S310, the terminal device sends compression capability information to the network device, where the compression capability information is used to indicate N Ethernet compression capabilities supported by the terminal device, and N is an integer greater than or equal to 1.

Herein, the Ethernet compression capability indicates a capability of compressing Ethernet data by the terminal device. Specifically, the Ethernet compression capability indicates whether the terminal device can compress Ethernet data, and if the terminal device can compress Ethernet data, the Ethernet compression capability indicates an Ethernet frame format of data that the terminal device can compress.

In a possible implementation, if the terminal device currently supports only one Ethernet compression capability, the compression capability information may include information used to indicate that a compression capability supported by the terminal device is the Ethernet compression capability. Actually, because the terminal device supports only one Ethernet compression capability, although the compression capability information does not explicitly indicate a type of the Ethernet compression capability, after receiving the compression capability information, the network device may learn that the terminal device should support only one Ethernet compression capability, and the network device may or may not learn of the type of the Ethernet compression capability supported by the terminal device. This does not affect another behavior of the network device.

In another possible implementation, the compression capability information may include information used to indicate N Ethernet frame formats supported by the terminal device.

That is, one Ethernet compression capability may correspond to one Ethernet frame format, and that the terminal device reports the N Ethernet compression capabilities indicates that the terminal device can compress data in the N Ethernet frame formats.

In a specific implementation, the Ethernet frame format may be indicated by using a frame format identifier used to identify the Ethernet frame format.

For Example, 1 represents an Ethernet frame format in the IEEE 802.3 protocol, and the Ethernet frame format in the 802.3 protocol may include Ethernet 802.3 raw, Ethernet 802.3 SAP, Ethernet 802.3 SNAP, or the like;

2 represents an 802.1Q Ethernet frame format;

3 represents an 802.1ad (or 802.1Q-In-Q) Ethernet frame format or a vlan stacking Ethernet frame format;

4 represents a PROFINET Ethernet frame format;

5 represents an EtherCAT Ethernet frame format; and 6 represents a Profisafe Ethernet frame format.

In S320, the network device sends compression configuration information to the terminal device, where the compression configuration information is used to indicate a parameter of a first Ethernet compression capability, and the N Ethernet compression capabilities include the first Ethernet compression capability.

Herein, the compression configuration information may be understood as information that the network device enables the terminal device to activate an Ethernet compression capability. After receiving the compression configuration information, the terminal device learns that the terminal device can compress Ethernet data.

Because data compression wastes a delay, in this step, the network device may configure the Ethernet compression capability for the terminal device based on a data performance requirement of a system. For example, if the system does not have a high requirement for a delay of data, the compression configuration information may be used to enable the terminal device to activate the Ethernet compression capability, and may further indicate several Ethernet compression capabilities that can be activate by the terminal device. If the system has a relatively high requirement for a delay of data, the compression configuration information may be used to disable the terminal device to activate the Ethernet compression capability.

For configuring of the Ethernet compression capability by the network device, the network device may configure the Ethernet compression capability at a device granularity, a bearer granularity, a logical channel granularity, or a QoS flow granularity.

For example, the compression configuration information is information for all bearers of the terminal device. That is, the Ethernet compression capability configured by using the compression configuration information is used on all bearers of the terminal device.

For another example, the compression configuration information is information for one bearer of the terminal device. That is, an Ethernet compression capability of each bearer of the terminal device is independently configured, and one piece of compression configuration information corresponds to one bearer.

For another example, the compression configuration information is information for some of all bearers of the terminal device. That is, some bearers of the terminal device have a same Ethernet compression capability, and one piece of compression configuration information corresponds to some bearers.

For another example, the compression configuration information is information for one logical channel of the terminal device. That is, an Ethernet compression capability of each logical channel is independently configured.

For another example, the compression configuration information is information for one quality of service (QoS) flow of the terminal device. That is, an Ethernet compression capability of each QoS flow is independently configured.

It should be understood that the compression configuration information is not only used to indicate the parameter of the first Ethernet compression capability, and if the network device configures that the terminal device can use a plurality of Ethernet compression capabilities to compress data, the compression configuration information may also be used to indicate a parameter of an Ethernet compression capability other than the first Ethernet compression capability in the plurality of Ethernet compression capabilities. The parameter of the another Ethernet compression capability is similar to the parameter of the first Ethernet compression capability. For brevity, in this embodiment of this application, the parameter of the first Ethernet compression capability is used as an example to describe a parameter of an Ethernet compression capability.

In a possible implementation, the compression configuration information may further indicate that the terminal device compresses only an Ethernet frame packet including an Ethernet frame carrying upper-layer data of a non-IP protocol type. The terminal device may also optionally indicate the capability during reporting.

In a possible implementation, the compression configuration information may further indicate a capability that the terminal device compresses only an Ethernet frame packet including an Ethernet frame carrying upper-layer data of an IP protocol type. The terminal device may also optionally indicate the capability during reporting.

In a possible implementation, if the terminal device receives the Ethernet compression configuration information, the terminal device further receives header compression (robust header compression, ROHC) compression configuration information. Optionally, if the terminal device supports neither ROHC compression nor Ethernet compression, the terminal device preferably performs IP header compression. Optionally, the terminal device may also report a capability whether the terminal device supports both the ROHC compression and the Ethernet header compression. The network device may indicate, based on the capability of the terminal, the terminal whether to enable both a ROHC compression function and an Ethernet header compression function.

In a possible implementation, the parameter of the first Ethernet compression capability includes an enabling parameter, and the enabling parameter is used to indicate the terminal device to use the first Ethernet compression capability.

The first Ethernet compression capability may be a unique Ethernet compression capability supported by the terminal device (in this case, N=1), or may be one of a plurality of Ethernet compression capabilities supported by the terminal device (in this case, N is greater than 1).

Specifically, if the terminal device supports only one Ethernet compression capability, the enabling parameter may be Boolean indication information, a first value indicates that the terminal device can use the first Ethernet compression capability, and a second value indicates that the terminal device cannot use the first Ethernet compression capability. If the first Ethernet compression capability is one of the plurality of Ethernet compression capabilities supported by the terminal device, and the enabling parameter may indicate that the terminal device can or cannot use all the Ethernet compression capabilities, the enabling parameter may also be Boolean indication information, a first value indicates that the terminal device can use the first Ethernet compression capability, and the second value indicates that the terminal device cannot use the first Ethernet compression capability.

It should be understood that although this embodiment of this application describes only a solution in which the terminal device can use the Ethernet compression capability, another indication meaning indicated by the enabling parameter is not affected, that is, the terminal device is indicated not to use the Ethernet compression capability. In addition, the enabling parameter may also indicate the terminal device to disable, release, or de-configure an Ethernet compression capability. For example, after the terminal device is enabled to activate an Ethernet compression capability, the network device indicates the terminal device to disable the Ethernet compression capability.

If the terminal device supports a plurality of Ethernet compression capabilities, and the network device configures that the terminal device can use some of the Ethernet compression capabilities, the enabling parameter may indicate that the terminal device can compress Ethernet data, and another parameter may be further required to indicate a specific Ethernet compression capability to be used.

Therefore, in a possible implementation, the parameter of the first Ethernet compression capability includes a frame format parameter used to indicate a first frame format, and the first frame format is a frame format of a first Ethernet packet.

In this way, the terminal device may learn, based on the frame format parameter, that the terminal device can compress Ethernet data generated based on the first frame format.

Certainly, the parameter of the first Ethernet compression capability may not include the enabling parameter, and the terminal device and the network device may negotiate. The frame format parameter in the compression configuration information indicates a frame format that can be compressed by the terminal device. In this way, the terminal device may determine, only by using the frame format parameter, that the terminal device can compress the Ethernet data generated based on the first frame format.

To enable the terminal device to learn of fields in the first frame format that need to be compressed, this embodiment of this application further provides a possible implementation: The parameter of the first Ethernet compression capability further includes an algorithm parameter used to indicate a compression algorithm of the first frame format.

Specifically, each frame format corresponds to at least one compression algorithm, or a plurality of frame formats may correspond to a same compression algorithm. In an example of the first frame format, the compression algorithm is used to indicate how to compress Ethernet data in the first frame format, or the compression algorithm may indicate a field that can be compressed in the first frame format, or the compression algorithm indicates a field that is used as context information in the first frame format.

In a standard protocol, each compression algorithm may correspond to one compression protocol, and the compression protocol specifically describes specification information of the compression algorithm, for example, a definition of a compression format.

In a possible configuration manner of indicating the compression algorithm, the configuration information received by the terminal device indicates specific fields whose content can be removed from the first frame format, and then the terminal device directly sends Ethernet data in the first frame format. For example, in uplink transmission, source address field information in an Ethernet data header is deleted, and Ethernet data obtained after the source address field information is deleted is sent.

It should be noted that the parameter of the first Ethernet compression capability may include at least one of the frame format parameter, a compression protocol parameter, or the algorithm parameter. When the parameter of the first Ethernet compression capability includes any of the three parameters, a specific compression algorithm used for each frame format may be specified in a protocol. If the parameter of the first Ethernet compression capability includes the frame format parameter, the terminal device learns that the first frame format is used to compress Ethernet data, and may directly obtain, based on a protocol specification, the compression algorithm corresponding to the first frame format parameter. If the parameter of the first Ethernet compression capability includes the algorithm parameter, the terminal device learns of the algorithm parameter and may obtain, based on a protocol specification, the first frame format corresponding to the algorithm parameter. If the parameter of the first Ethernet compression capability includes the compression protocol parameter, the terminal device learns of the compression protocol parameter and may obtain, based on a protocol specification, a compression algorithm corresponding to the compression protocol parameter.

In S330, the terminal device generates the first Ethernet packet based on the parameter of the first Ethernet compression capability. That is, the terminal device compresses Ethernet data based on the parameter of the first Ethernet compression capability, that is, removes context information (or static information) of the Ethernet data, to generate the compressed first Ethernet packet.

It should be noted that the first Ethernet packet may be a PDCP layer packet, or may be an Ethernet packet compressed at another protocol layer. This is not limited in this embodiment of this application. For example, the first Ethernet packet may alternatively be a packet at an application layer (or referred to as an upper layer, upper layer), a service data applicable protocol (SDAP) layer, a radio link control (RLC) or MAC layer of the terminal device.

In S340, the terminal device sends the first Ethernet packet to the network device.

In S350, the network device decompresses the first Ethernet packet.

To interact with another device, the network device needs to further encapsulate the first Ethernet packet. Therefore, the network device needs to restore the first Ethernet packet to a packet existing before compression. In other words, the network device needs to add the context information removed by the terminal device to the first Ethernet packet, and restore a header of the first Ethernet packet, to complete decompression of the first Ethernet packet.

Therefore, according to the Ethernet data-based communication method provided in this embodiment of this application, the terminal device reports an Ethernet compression capability of the terminal device to the network device, and the network device configures one or more Ethernet compression capabilities for the terminal device based on the Ethernet compression capability of the terminal device. In addition, the terminal device compresses Ethernet data based on the Ethernet compression capability configured by the network device, and sends a compressed packet to the network device. A manner in which the network device enables the terminal device to use the Ethernet compression capability is proposed. In addition, the terminal device and the network device can transmit the compressed Ethernet data in a wireless network, to effectively save resources.

As an example instead of a limitation, step S310 may not be required in this embodiment of this application. To be specific, the network device does not need to configure the Ethernet compression capability for the terminal device based on the compression capability information received from the terminal device, and may directly configure the Ethernet compression capability for the terminal device. For example, when the terminal device supports only one Ethernet compression capability, the network device may learn, based on an uncompressed Ethernet packet sent by the terminal device, that the terminal device supports only one Ethernet compression capability, and the terminal device may not need to report the Ethernet compression capability supported by the terminal device. The network device may send the compression configuration information to the terminal device based on a data performance requirement of the system, to indicate the Ethernet compression capability uniquely supported by the terminal device.

In this embodiment of this application, the network device may be an access network device or a core network device. That the terminal device receives information from the network device (for example, a network device A) described in this embodiment of this application may be that the terminal device directly interacts with the network device A to receive the information. In this case, it may be considered that the information is generated by the network device A. Alternatively, the information may be information obtained by the network device A from another network device (for example, denoted as a network device B1), and then the network device A forwards or transparently transmits the information to the terminal device. In this case, it may be considered that the information is generated by the network device B1 or a network device C1. The network device B1 receives information from the network device C1. Likewise, that the network device (for example, the network device A) receives information from the terminal device in this embodiment of this application may be that the terminal device directly interacts with the network device A, and the network device A directly receives information from the terminal device. Alternatively, the terminal device may send information to another network device (for example, the network device B1), the network device B1 directly sends the information to the network device A, or sends the information to the network device A through another network device (for example, the network device C1).

As an example instead of a limitation, the following describes a transmission path of the compression configuration information and the compression capability information by using examples in which the network device is separately an access network device and a core network device.

1. The network device is an access network device.

A. The access network device generates the compression configuration information.

A transmission path of the compression configuration information is: the access network device→ the terminal device.

B. The access network device obtains the compression configuration information from another device.

A possible transmission path of the compression configuration information is: an AMF network element→ a UPF network element→ the access network device→ the terminal device. In this case, the compression configuration information may be generated by the AMF network element. It may be understood that the access network device receives the compression configuration information from the AMF network element or the UPF network element. The UPF network element forwards or transparently transmits the compression configuration information generated by the AMF network element to the access network device. Another possible transmission path of the compression configuration information is: an SMF network element→ a UPF network element→ the access network device→ the terminal device. In this case, the compression configuration information may be generated by the SMF network element. It may be understood that the access network device receives the compression configuration information from the SMF network element or the UPF network element. The UPF network element forwards or transparently transmits the compression configuration information generated by the SMF network element to the access network device. Another possible transmission path of the compression configuration information is: a UPF network element→ the access network device→ the terminal device. In this case, the compression configuration information may be generated by the UPF network element. It may be understood that the access network device receives the compression configuration information from the UPF network element.

When the network device is the access network device, a possible transmission path of the compression capability information is as follows: the terminal device→ the access network device. If the compression configuration information is generated by a core network device, the access network device may send the compression capability information to the core network device.

2. The network device is a core network device.

Because there is a relatively large quantity of core network devices, a UPF network element is used as an example. A case of another core network device is similar to this case. For brevity, details are not described again. That the terminal device receives information from the network device, and the network device receives information from the terminal device may be understood as that the UPF network element communicates with the terminal device through the core network device to transmit information.

A. The UPF network element generates the compression configuration information.

A possible transmission path of the compression configuration information is: the UPF network element→ an access network device→ the terminal device.

B. The UPF network element obtains the compression configuration information from another device.

A possible transmission path of the compression configuration information is: an AMF network element→ the UPF network element→ an access network device→ the terminal device. Another possible transmission path of the compression configuration information is: an SMF network element→ the UPF network element→ an access network device→ the terminal device.

When the network device is the UPF network element, a possible transmission path of the compression capability information is: the terminal device→ the access network device→ the UPF network element. Another possible transmission path of the compression capability information is: the terminal device→ the access network device→ the AMF network element→ the SMF network element→ the UPF network element.

In various transmission paths of the compression configuration information, any two devices may transmit the compression configuration information by using different signaling. For example, the AMF network element may send the compression configuration information to the UPF network element by using non-access-stratum (NAS) signaling. The NAS signaling may be a registration response message or a protocol data unit (PDU) session establishment message. For another example, the AMF network element may send the compression configuration information to the terminal device through the access network device by using NAS signaling. For another example, the access device sends the compression configuration information to the terminal device by using RRC signaling or PDCP control signaling. For another example, the UPF network element may send the compression configuration information to the terminal device through another device by using compression signaling in an Ethernet packet.

It can be learned from the foregoing description that the first Ethernet packet does not include the context information (denoted as first context information for ease of distinguishing and understanding). However, to enable the network device to obtain the first context information to decompress the first Ethernet packet, this embodiment of this application provides a possible implementation:

The first Ethernet packet includes a first header, the first header includes a first context identifier, and the first context identifier is used to identify the first context information.

The Method Further Includes:

the network device obtains the first context information based on the first context identifier; and that the network device decompresses the first Ethernet packet includes:

the network device decompresses the first Ethernet packet based on the first context information.

That is, the network device obtains the first context identifier from the first header of the first Ethernet packet, and obtains, based on the first context identifier, the context information (that is, the first context information) corresponding to the first context identifier, to decompress the first Ethernet packet based on the first context information. The first context information may be context information in different frame formats that are listed above and that are not listed. The first context identifier is located in a field (denoted as a field 1 for ease of distinguishing and understanding) in the first header. That is, the field 1 is used to carry the first context identifier.

As an example instead of a limitation, the first header may further include another field, and each field carries corresponding content.

As an example instead of a limitation, the first header further includes at least one of the following fields:

1. a field (denoted as a field 2 for ease of distinguishing and understanding) used to indicate whether the first Ethernet packet is a compressed packet or not, where the field 2 indicates that the first Ethernet packet is compressed;

2. a field (denoted as a field 3 for ease of distinguishing and understanding) used to indicate a compression configuration identifier of the frame format of the first Ethernet packet;

3. a field (denoted as a field 4 for ease of distinguishing and understanding) used to indicate a cyclic redundancy check (CRC); and 4. a field (denoted as a field 5 for ease of distinguishing and understanding) used to indicate whether the header includes one or more of the field 1, the field 2, the field 3, and the field 4. In this way, the terminal device can determine, based on the field 5, a field included in the first header, that is, determine a format of the first header, to read content of each field based on the determined format of the first header.

Figure 5:
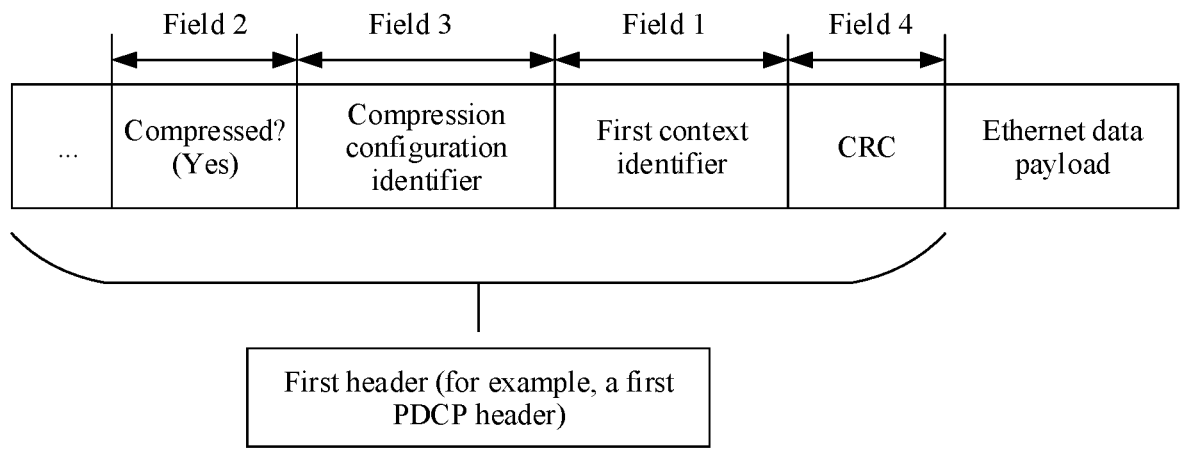
FIG. 5 is a schematic diagram of a frame format of a first Ethernet packet according to an embodiment of this application.

As an example instead of a limitation, FIG. 5 is a schematic diagram of the frame format of the first Ethernet packet according to this embodiment of this application. As shown in FIG. 5, the first Ethernet packet includes data and a header (that is, the first header). The first header includes at least four fields, that is, a field 1, a field 2, a field 3, and a field 4. The field 1 carries the first context identifier, the field 2 carries information used to indicate that the first Ethernet packet is compressed, the field 3 carries the compression configuration identifier, and the field 4 carries the CRC.

Therefore, in this embodiment of this application, a context identifier used to identify context information is added to a header of an Ethernet packet, so that the network device further obtains the corresponding context information by using the context identifier, to effectively ensure that the network device successfully decompresses the Ethernet packet.

As described above, the network device may obtain, based on the first context identifier, the context information corresponding to the first context identifier. Specifically, the network device may obtain the first context information from a first correspondence between the first context identifier and the first context information based on the first context identifier. For a manner of obtaining the first correspondence by the network device, this embodiment of this application provides various possible implementations. The following describes a specific manner of obtaining the first correspondence by the network device.

Manner 1

In Manner 1, the network device obtains the first correspondence from the terminal device. In other words, the terminal device generates the first correspondence, and sends the first correspondence to the network device.

The terminal device may send the first correspondence before the first Ethernet packet is generated, or after the first Ethernet packet is generated, provided that the terminal device sends the first correspondence to the network device before the network device decompresses the first Ethernet packet.

In a possible implementation, the terminal device sends a correspondence between a context identifier and context information to the network device, where the correspondence includes the first correspondence. The correspondence represents a correspondence between at least one context identifier and at least one piece of context information, and each context identifier corresponds to one piece of context information.

The following uses the first correspondence as an example to describe a manner of sending the correspondence by the terminal device.

In a possible implementation, the terminal device may send the first correspondence to the network device by using signaling in various forms, for example, radio resource control (RRC) signaling or non-access-stratum (NAS) signaling, or signaling of an application layer at which an Ethernet header is compressed.

In this manner, a correspondence other than the first correspondence in the correspondence may also be carried by using the signaling, or the another correspondence may be carried by using another signaling. This embodiment of this application is not limited thereto.

In an actual industrial scenario, one network device may correspond to a plurality of terminal devices. This means that one destination MAC address may correspond to a plurality of source MAC addresses. Generally, both the destination MAC address and the source MAC addresses belong to the context information. In this case, for a same frame format, even if fields of the compressed frame formats are the same, source MAC addresses are not completely the same, and the destination MAC addresses are not completely the same. For example, one network device corresponds to two terminal devices (a terminal device A and a terminal device B). For a same frame format, there are two pieces of context information. One piece of context information includes MAC addresses of the network device and the terminal device A, and the other piece of context information includes MAC addresses of the network device and the terminal device B. In addition, when a context identifier is configured for context information, for all context information, one context identifier may be configured for one piece of context information, and any two context identifiers are different. However, in this way, a relatively large quantity of bits are occupied. To reduce the quantity of bits, a context identifier may be generated for one frame format. For example, if a frame format 1 corresponds to two context identifiers, and a frame format 2 corresponds to two context identifiers, the two context identifiers in the frame format 1 may be 0 and 1, and the two context identifiers in the frame format 2 may also be 0 and 1.

Therefore, to reduce a quantity of bits occupied by context identifier, a plurality of pieces of context information for each frame format may be generated. The first correspondence is used as an example. In a possible implementation, the terminal device sends, to the network device, information used to indicate a frame format (that is, the first frame format) corresponding to the first correspondence. In this way, the network device may learn that the first correspondence is a correspondence for the first frame format, and store the context identifier that reduces the quantity of bits.

The first frame format and the first correspondence may be carried in same information, or may be carried in different information. This is not limited in this embodiment of this application.

From a perspective of signaling saving, when sending an uncompressed Ethernet packet, the terminal device may also use a header of the uncompressed Ethernet packet to carry a correspondence. The correspondence indicates context information of a frame format of the uncompressed Ethernet packet and a corresponding context identifier. In this way, the network device may obtain the correspondence from the uncompressed Ethernet packet and store the correspondence. In this way, if the terminal device subsequently sends a compressed Ethernet packet in a frame format the same as the frame format of the uncompressed Ethernet packet, the network device may directly obtain context information of the compressed Ethernet packet based on the prestored correspondence, and then successfully decompress the Ethernet packet.

Therefore, for the first correspondence, in another possible implementation, the terminal device sends a second Ethernet packet to the network device, where the second Ethernet packet includes a second header, and the second header includes the first correspondence.

In this manner, a correspondence other than the first correspondence in the correspondence may also be carried in the uncompressed Ethernet packet.

Likewise, to reduce the quantity of bits occupied by the context identifier, in a possible implementation, the second header further includes a frame format of the second Ethernet packet, and the frame format of the second Ethernet packet is the same as the frame format (that is, the first frame format) of the first Ethernet packet.

Figure 6:
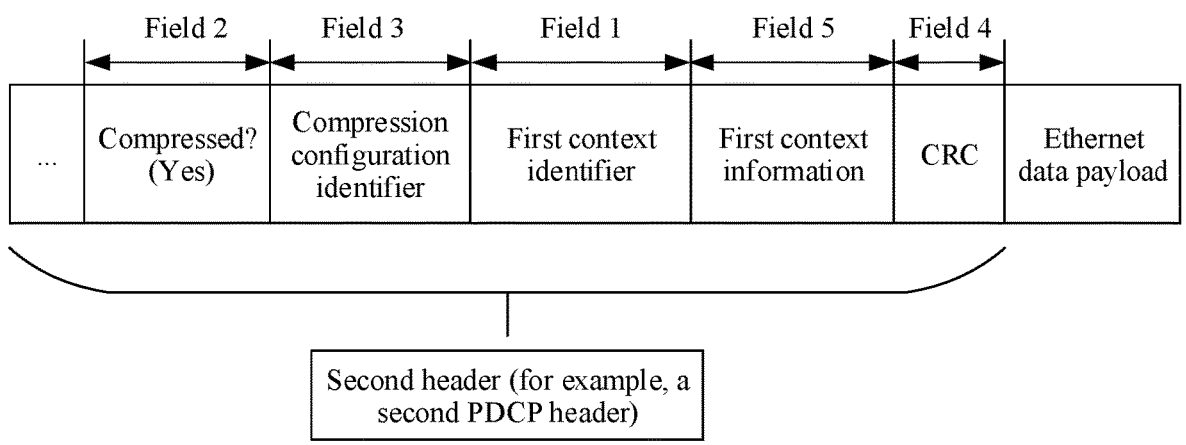
FIG. 6 is a schematic diagram of a frame format of a second Ethernet packet according to an embodiment of this application.

As an example instead of a limitation, FIG. 6 is a schematic diagram of the frame format of the second Ethernet packet according to this embodiment of this application. As shown in FIG. 6, the frame format of the second Ethernet packet is a frame format of an uncompressed packet, the second Ethernet packet includes data and a header (that is, the second header), and the second header includes at least a field 1 and a field 5. The field 1 carries the first context identifier, and the field 5 carries the first context information. Optionally, the second header may further include at least one of a field 2, a field 3, or a field 4. The field 2 carries information used to indicate that the second Ethernet packet is not compressed, the field 3 carries a compression configuration identifier used to indicate the frame format of the second Ethernet packet, and the field 4 carries a CRC.

In Manner 1, the network device and the terminal device need to jointly maintain the correspondence between the context identifier and the context information. Considering a buffer capability of the terminal device, to prevent the correspondence generated by the terminal device from exceeding the buffer capability of the terminal device, this embodiment of this application further provides a possible implementation:

The network device sends first indication information to the terminal device, where the first indication information is used to indicate a maximum quantity of pieces of context information generated by the terminal device.

Manner 2

The network device obtains the first correspondence from a prestored correspondence between at least one piece of context information and at least one context identifier based on the first context identifier. Each piece of context information corresponds to one context identifier.

In Manner 2, the prestored correspondence may be specified by the system or a protocol, or may be generated by the network device in advance. It may be understood that the system or the protocol may configure M pieces of context information for different frame formats that can be compressed, or the network device may generate M pieces of context information based on different frame formats that can be compressed. In addition, to facilitate searching and identification, a corresponding context identifier is configured for each piece of context information.

The foregoing describes the correspondence in this embodiment of this application in detail. The following describes feedback to related information in this embodiment of this application.

In this embodiment of this application, related feedback modes are set for both whether the network device successfully receives the first correspondence and whether the network device successfully decompresses the first Ethernet packet.

In a possible implementation, the method further includes:

the terminal device receives feedback mode information, where the feedback mode information includes any one of the following: an acknowledgment (ACK) feedback mode, a negative acknowledgment (NACK) feedback mode, or a non-feedback mode.

The foregoing three feedback modes are described by using a case of receiving the first correspondence by the network device as an example.

The ACK feedback mode indicates that if the network device successfully receives the first correspondence, the network device sends feedback information to the terminal device. On the contrary, if the network device fails to receive the first correspondence, the network device does not send the feedback information, and if the terminal device does not receive the feedback information within preset duration, it is considered that the network device fails to receive the first correspondence.

The NACK feedback mode indicates that if the network device fails to receive the first correspondence, the network device sends feedback information to the terminal device. On the contrary, if the network device successfully receives the first correspondence, the network device does not send the feedback information, and if the terminal device does not receive the feedback information within preset duration, it is considered that the network device successfully receives the first correspondence.

The non-feedback mode indicates that after sending the first correspondence, the terminal device does not pay attention to whether the network device successfully receives the first correspondence, and does not need to receive feedback information sent by the network device.

Likewise, the foregoing three feedback modes are described by using a case of decompressing the first Ethernet packet by the network device as an example.

The ACK feedback mode indicates that if the network device successfully decompresses the first Ethernet packet, the network device sends feedback information to the terminal device. On the contrary, if the network device fails to decompress the first Ethernet packet, the network device does not send the feedback information, and if the terminal device does not receive the feedback information within preset duration, it is considered that the network device fails to decompress the first Ethernet packet.

The NACK feedback mode indicates that if the network device fails to decompress the first Ethernet packet, the network device sends feedback information to the terminal device. On the contrary, if the network device successfully decompresses the first Ethernet packet, the network device does not send the feedback information, and if the terminal device does not receive the feedback information within preset duration, it is considered that the network device successfully decompresses the first Ethernet packet.

The non-feedback mode indicates that after sending the first Ethernet packet, the terminal device does not pay attention to whether the network device successfully decompresses the first Ethernet packet, and does not need to receive feedback information sent by the network device.

For the non-feedback mode, optionally, the terminal device may receive other parameters related to the non-feedback mode, for example, N and M, from the configuration information of the network device. N represents a quantity of times that a transmit end (for example, the terminal device) sends uncompressed packets to enable a compression mode. M represents duration in which the transmit end (for example, the terminal device) can send compressed packets after enabling the compression mode. The compression mode is used for sending compressed packets before a timer expires, and compressed context information is reset after the timer expires.

The following uses the ACK feedback mode as an example to describe a process in which the network device sends feedback information for the case of receiving the first correspondence by the network device and the case of decompressing the first Ethernet data by the network device.

The Case of Receiving the First Correspondence by the Network Device:

In a possible implementation, the method further includes:

the network device sends first feedback information to the terminal device, where the first feedback information is used to indicate that the network device successfully receives the first correspondence.

As an example instead of a limitation, the first feedback information may include at least one of the following content: the first context identifier or ACK information.

In a possible implementation, if the first correspondence is carried in the second header of the second Ethernet packet, the first feedback information may further include a sequence of the second Ethernet packet. This manner can also indicate that the network device successfully receives the first correspondence.

Figure 7:
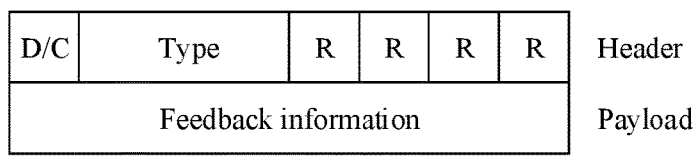
FIG. 7 is a schematic diagram of a frame format of a packet used to carry feedback information according to an embodiment of this application.

In this embodiment of this application, a packet used to carry feedback information may be independently designed. For the first feedback information, the first feedback information is carried in a payload of the packet sent by the network device. FIG. 7 is a schematic diagram of a frame format of the packet used to carry the feedback information according to this embodiment of this application. As shown in FIG. 7, the packet includes a header and a payload. The header may include at least a field used to indicate whether the packet is a packet of data or a packet of control information, that is, D/C, where D represents data, and C represents control information. The header includes a type field. For example, the type field may be a field used to indicate feedback information for Ethernet compression. R represents a reserved field. The payload carries feedback information (for example, the first feedback information).

The Case of Decompressing the First Ethernet Packet by the Network Device:

In a possible implementation, the method further includes:

the network device sends second feedback information to the terminal device, where the second feedback information is used to indicate that the network device successfully decompresses the first Ethernet packet.

As an example instead of a limitation, the second feedback information may include at least one of the following content: a sequence of the first Ethernet packet or ACK information.

In this embodiment of this application, a packet used to carry feedback information may be independently designed. For the second feedback information, the second feedback information is carried in a payload of the packet sent by the network device. For a frame format of the packet used to carry the feedback information, refer to the description in FIG. 7. For brevity, details are not described herein again.

In this embodiment of this application, in a possible implementation, the terminal device may send, to the network device, indication information used to indicate to reset compressed context. The indication information is used to indicate the network device to delete context information stored in the network device, or it may be understood as that the two parties need to renegotiate compression of context information.

It should be noted that the steps in this embodiment of this application may be implemented on one functional entity, or may be implemented on a plurality of entities. The entity is a logical entity, and is implemented in a form of a logical instance. Specifically, a function of the entity is implemented by software. It is assumed that this embodiment of this application may include a PDCP entity and a compression/decompression entity. In a possible implementation, S310 and/or S320 may be implemented on the PDCP entity, and S330 and/or S350 may be implemented on the compression/decompression entity. After performing S310 and/or S320, the PDCP entity enables the compression/decompression entity, and the compression/decompression entity generates an Ethernet packet, and sends the Ethernet packet to a compression/decompression entity of the network device, so that the network device performs a decompression function. In another possible implementation, this embodiment of this application may be all implemented on the PDCP entity. In another possible implementation, this embodiment of this application may be all implemented on the compression/decompression entity.

The foregoing describes a process of compressing and processing Ethernet data in this embodiment of this application from a perspective of uplink transmission. The following further describes a process of compressing and processing Ethernet data in this embodiment of this application from a perspective of downlink transmission. In the following embodiments, to distinguish from the parameter of the Ethernet compression capability, the Ethernet packet, and the like in the foregoing embodiments, third and fourth are used for distinguishing. The first, the second, the third, the fourth, and the like are not intended to limit a sequence. In addition, from a downlink perspective, third and fourth herein may be replaced with first and second.

Figure 8:
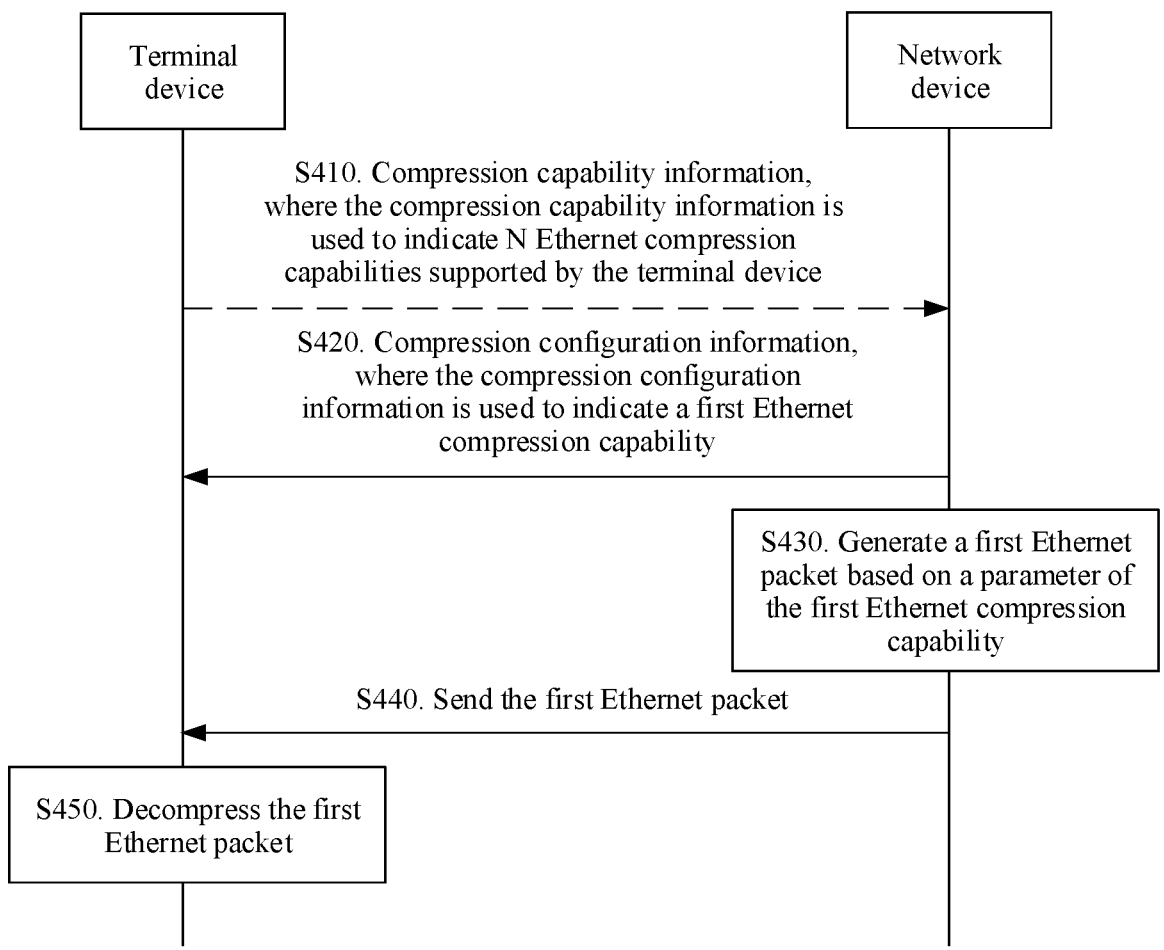
FIG. 8 is a schematic interaction diagram of another Ethernet data-based communication method according to an embodiment of this application.

FIG. 8 is a schematic interaction diagram of an Ethernet data-based communication method 400 according to an embodiment of this application.

In this embodiment, a terminal device reports an Ethernet compression capability of the terminal device to a network device, and the network device configures one or more Ethernet compression capabilities for the terminal device based on the Ethernet compression capability of the terminal device. In addition, the network device compresses Ethernet data based on the configured Ethernet compression capability, and sends a compressed packet to the terminal device.

Each Step of the Method 400 is Described Below.

In S410, the terminal device sends compression capability information to the network device, where the compression capability information is used to indicate N Ethernet compression capabilities supported by the terminal device, and N is an integer greater than or equal to 1.

For description of S410, refer to the description of S310 in the method 300. For brevity, details are not described again.

In S420, the network device sends compression configuration information to the terminal device, where the compression configuration information is used to indicate a parameter of a third Ethernet compression capability, and the N Ethernet compression capabilities include the third Ethernet compression capability.

Herein, the compression configuration information may be understood as information that the network device enables the terminal device to activate an Ethernet compression capability. A function of the compression configuration information is slightly different from a specific function of the compression configuration information in the uplink transmission. To be specific, after receiving the compression configuration information, the terminal device is enabled to activate the Ethernet compression capability, and learns of a compressed Ethernet packet subsequently sent by the network device, and an Ethernet compression capability that is used to compress the Ethernet packet, to decompress compressed Ethernet data sent by the network device.

It should be emphasized herein that the terminal device is enabled to activate the Ethernet compression capability, indicating that the terminal device can decompress received compressed Ethernet data. In actual processing, a functional entity may also be configured for a compression or decompression function. Based on the compression configuration information, the received Ethernet packet may be directly completed based on a decompression functional entity.

The following briefly describes the parameter of the third Ethernet compression capability.

In a possible implementation, the parameter of the third Ethernet compression capability includes an enabling parameter, and the enabling parameter is used to indicate the terminal device to use the third Ethernet compression capability.

For description of the enabling parameter, refer to the description of the enabling parameter in S320 in the method 300.

In a possible implementation, the parameter of the third Ethernet compression capability includes a frame format parameter used to indicate a third frame format, and the third frame format is a frame format of a third Ethernet packet.

In this way, the terminal device may learn, based on the frame format parameter, that the network device can compress Ethernet data generated based on the third frame format.

Certainly, the parameter of the third Ethernet compression capability may not include the enabling parameter, and the terminal device and the network device may negotiate. The frame format parameter in the compression configuration information indicates a frame format that can be compressed by the network device. In this way, the terminal device may determine, only by using the frame format parameter, that the terminal device can decompress the Ethernet data generated based on the third frame format.

In a possible implementation, the parameter of the third Ethernet compression capability further includes an algorithm parameter used to indicate a compression algorithm of the third frame format.

For description of the algorithm parameter, refer to the description of the algorithm parameter in the uplink transmission. For brevity, details are not described herein again.

It should be emphasized that, for downlink transmission, in a possible configuration manner of indicating a compression algorithm, the configuration information received by the terminal device indicates fields whose content has been removed from the third frame format.

In S430, the network device generates the third Ethernet packet based on the parameter of the third Ethernet compression capability.

That is, the network device compresses Ethernet data based on the parameter of the third Ethernet compression capability, that is, removes context information of the Ethernet data, to generate the compressed third Ethernet packet.

It should be understood that, similar to the first Ethernet packet in the uplink transmission, the third Ethernet packet in the downlink transmission may be an Ethernet packet at a PDCP layer, or may be an Ethernet packet at another protocol layer. This is not limited in this embodiment of this application.

In S440, the network device sends the third Ethernet packet to the terminal device.

In S450, the terminal device decompresses the third Ethernet packet.

To be specific, the terminal device needs to restore the third Ethernet packet to a packet existing before compression. In other words, the terminal device needs to add the context information removed by the network device to the third Ethernet packet, and restore a header of the third Ethernet packet, to complete decompression of the third Ethernet packet.

Therefore, according to the Ethernet data-based communication method provided in this embodiment of this application, the terminal device reports an Ethernet compression capability of the terminal device to the network device, and the network device configures one or more Ethernet compression capabilities for the terminal device based on the Ethernet compression capability of the terminal device, so that the terminal device enables a decompression function for an Ethernet packet. In addition, the terminal device sends a compressed packet to the network device. A manner in which the network device enables the terminal device to use the Ethernet compression capability is proposed. In addition, the terminal device and the network device can transmit the compressed Ethernet data in a wireless network, to effectively reduce signaling overheads.

To enable the terminal device to obtain context information to decompress the third Ethernet packet, this embodiment of this application provides a possible implementation: The third Ethernet packet includes a third header, the third header includes a third context identifier, and the third context identifier is used to identify third context information.

The Method Further Includes:

the terminal device obtains the third context information based on the third context identifier; and that the terminal device decompresses the third Ethernet packet includes:

the terminal device decompresses the third Ethernet packet based on the third context information.

That is, the terminal device obtains the third context identifier from the third header of the third Ethernet packet, and obtains, based on the third context identifier, the context information (that is, the third context information) corresponding to the third context identifier, to decompress the third Ethernet packet based on the third context information. The third context information may be context information in different frame formats that are listed above and that are not listed.

For description of the third header of the third Ethernet packet in the downlink transmission, refer to the foregoing description of the first header of the first Ethernet packet in the uplink transmission. For brevity, details are not described herein again.

Therefore, in this embodiment of this application, a context identifier used to identify context information is added to a header of an Ethernet packet, so that the terminal device further obtains the corresponding context information by using the context identifier, to effectively ensure that the terminal device successfully decompresses the Ethernet packet.

As described above, the terminal device may obtain, based on the third context identifier, the context information corresponding to the third context identifier. Specifically, the terminal device may obtain the third context information from a third correspondence between the third context identifier and the third context information based on the third context identifier. For a manner of obtaining the third correspondence by the terminal device, this embodiment of this application provides various possible implementations. The following briefly describes a specific manner of obtaining the third correspondence by the terminal device.

Manner 3

In Manner 3, the terminal device obtains the third correspondence from the network device. In other words, the network device generates the third correspondence, and sends the third correspondence to the terminal device.

In a possible implementation, the network device sends a correspondence between a context identifier and context information to the terminal device, where the correspondence includes the third correspondence. The correspondence represents a correspondence between at least one context identifier and at least one piece of context information, and each context identifier corresponds to one piece of context information.

The following uses the third correspondence as an example to describe a manner of sending the correspondence by the network device.

In a possible implementation, the network device may send the third correspondence to the terminal device by using signaling in various forms, for example, radio resource control (RRC) signaling.

To reduce a quantity of bits occupied by the context identifier, a plurality of pieces of context information for each frame format may be generated. The third correspondence is used as an example. In a possible implementation, the network device sends, to the terminal device, information used to indicate a frame format (that is, the third frame format) corresponding to the third correspondence. In this way, the terminal device may learn that the third correspondence is a correspondence for the third frame format, and store the context identifier that reduces the quantity of bits.

The third frame format and the third correspondence may be carried in same information, or may be carried in different information. This is not limited in this embodiment of this application.

From a perspective of signaling saving, when sending an uncompressed Ethernet packet, the network device may also use a header of the uncompressed Ethernet packet to carry a correspondence. The correspondence indicates context information of a frame format of the uncompressed Ethernet packet and a corresponding context identifier. In this way, the terminal device may obtain the correspondence from the uncompressed Ethernet packet and store the correspondence. In this way, if the network device subsequently sends a compressed Ethernet packet in a frame format the same as the frame format of the uncompressed Ethernet packet, the terminal device may directly obtain context information of the compressed Ethernet packet based on the prestored correspondence, and then successfully decompress the Ethernet packet.

Therefore, for the third correspondence, in another possible implementation, the network device sends a fourth Ethernet packet to the terminal device, where the fourth Ethernet packet includes a fourth header, and the fourth header includes the third correspondence.

In this manner, a correspondence other than the third correspondence in the correspondence may also be carried in the uncompressed Ethernet packet.

Likewise, to reduce the quantity of bits occupied by the context identifier, in a possible implementation, the fourth header further includes a frame format of the fourth Ethernet packet, and the frame format of the fourth Ethernet packet is the same as the frame format (that is, the third frame format) of the third Ethernet packet.

For description of the fourth header of the fourth Ethernet packet in the downlink transmission, refer to the foregoing description of the second header of the second Ethernet packet in the method 300. For brevity, details are not described herein again.

In this manner, the network device and the terminal device need to jointly maintain the correspondence between the context identifier and the context information. Considering a buffer capability of the terminal device, to prevent the correspondence generated by the terminal device from exceeding the buffer capability of the terminal device, this embodiment of this application further provides a possible implementation:

The network device sends first indication information to the terminal device, where the first indication information is used to indicate a maximum quantity of pieces of context information generated by the terminal device.

Manner 4

The terminal device obtains the third correspondence from a prestored correspondence between at least one piece of context information and at least one context identifier based on the third context identifier. Each piece of context information corresponds to one context identifier.

In this manner, the prestored correspondence may be specified by a system or a protocol, or may be generated by the terminal device in advance. It may be understood that the system or the protocol may configure M pieces of context information for different frame formats that can be compressed, or the terminal device may generate M pieces of context information based on different frame formats that can be compressed. In addition, to facilitate searching and identification, a corresponding context identifier is configured for each piece of context information.

The foregoing describes the correspondence in this embodiment of this application in detail. The following describes feedback to related information in this embodiment of this application.

In this embodiment of this application, related feedback modes are set for both whether the terminal device successfully receives the third correspondence and whether the terminal device successfully decompresses the third Ethernet packet.

In a possible implementation, the method further includes:

the network device sends feedback mode information, where the feedback mode information includes any one of the following: an acknowledgment (ACK) feedback mode, a negative acknowledgment (NACK) feedback mode, or a non-feedback mode.

As an example instead of a limitation, the feedback mode information may be configuration information sent by the network device.

The foregoing three feedback modes are described by using a case of receiving the third correspondence by the terminal device as an example.

The ACK feedback mode indicates that if the terminal device successfully receives the third correspondence, the terminal device sends feedback information to the network device. On the contrary, if the terminal device fails to receive the third correspondence, the terminal device does not send the feedback information, and if the network device does not receive the feedback information within preset duration, it is considered that the terminal device fails to receive the third correspondence.

The NACK feedback mode indicates that if the terminal device fails to receive the third correspondence, the terminal device sends feedback information to the network device. On the contrary, if the terminal device successfully receives the third correspondence, the terminal device does not send the feedback information, and if the network device does not receive the feedback information within preset duration, it is considered that the terminal device successfully receives the third correspondence.

The non-feedback mode indicates that after sending the third correspondence, the network device does not pay attention to whether the terminal device successfully receives the third correspondence, and does not need to receive feedback information sent by the terminal device.

For the non-feedback mode, optionally, the terminal device may receive other parameters related to the non-feedback mode, for example, N and M, from the configuration information of the network device. N represents a quantity of times that a transmit end (for example, the network device) sends uncompressed packets to enable a compression mode. M represents duration in which the transmit end (for example, the network device) can send compressed packets after enabling the compression mode. The compression mode is used for sending compressed packets before a timer expires, and compressed context information is reset after the timer expires.

Likewise, the foregoing three feedback modes are described by using a case of decompressing the third Ethernet packet by the terminal device as an example.

The ACK feedback mode indicates that if the terminal device successfully decompresses the third Ethernet packet, the terminal device sends feedback information to the network device. On the contrary, if the terminal device fails to decompress the third Ethernet packet, the terminal device does not send the feedback information, and if the network device does not receive the feedback information within preset duration, it is considered that the terminal device fails to decompress the third Ethernet packet.

The NACK feedback mode indicates that if the terminal device fails to decompress the third Ethernet packet, the terminal device sends feedback information to the network device. On the contrary, if the terminal device successfully decompresses the third Ethernet packet, the terminal device does not send the feedback information, and if the network device does not receive the feedback information within preset duration, it is considered that the terminal device successfully decompresses the third Ethernet packet.

The non-feedback mode indicates that after sending the third Ethernet packet, the network device does not pay attention to whether the terminal device successfully decompresses the third Ethernet packet, and does not need to receive feedback information sent by the terminal device.

The following uses the ACK feedback mode as an example to describe a process in which the terminal device sends feedback information for the case of receiving the third correspondence by the terminal device and the case of decompressing the third Ethernet data by the terminal device.

The Case of Receiving the Third Correspondence by the Terminal Device:

In a possible implementation, the method further includes:

the terminal device sends third feedback information to the network device, where the third feedback information is used to indicate that the terminal device successfully receives the third correspondence.

As an example instead of a limitation, the third feedback information may include at least one of the following content: the third context identifier or ACK information.

In a possible implementation, if the third correspondence is carried in the fourth header of the fourth Ethernet packet, the third feedback information may further include a sequence of the fourth Ethernet packet. This manner can also indicate that the terminal device successfully receives the third correspondence.

In this embodiment of this application, a packet used to carry feedback information may be independently designed. For the third feedback information, the third feedback information is carried in a payload of the packet sent by the terminal device. For description of a frame format of the packet used to carry the feedback information, refer to the description in FIG. 7. For brevity, details are not described herein again.

The Case of Decompressing the Third Ethernet Packet by the Terminal Device:

In a possible implementation, the method further includes:

the terminal device sends fourth feedback information to the network device, where the fourth feedback information is used to indicate that the terminal device successfully decompresses the third Ethernet packet.

As an example instead of a limitation, the fourth feedback information may include at least one of the following content: a sequence of the third Ethernet packet or ACK information.

In this embodiment of this application, a packet used to carry feedback information may be independently designed. For the fourth feedback information, the fourth feedback information is carried in a payload of the packet sent by the terminal device. For a frame format of the packet used to carry the feedback information, refer to the description in FIG. 7. For brevity, details are not described herein again.

Likewise, similar to the uplink transmission, the steps in this embodiment of this application may be implemented on one functional entity, or may be implemented on a plurality of entities. The entity is a logical entity, and is implemented in a form of a logical instance. Specifically, a function of the entity is implemented by software. It is assumed that this embodiment of this application may include a PDCP entity and a compression/decompression entity. In a possible implementation, S410 and/or S420 may be implemented on the PDCP entity, and S430 and/or S450 may be implemented on the compression/decompression entity. After performing S410 and/or S420, the PDCP entity enables the compression/decompression entity, generates an Ethernet packet, and sends the Ethernet packet to the compression/decompression entity of the terminal device, so that the terminal device performs a decompression function. In another possible implementation, this embodiment of this application may be all implemented on the PDCP entity. In another possible implementation, this embodiment of this application may be all implemented on the compression/decompression entity.

The foregoing describes the process of compressing and processing Ethernet data in the embodiments of this application from the perspectives of uplink transmission and downlink transmission. The following further describes a process of compressing and processing Ethernet data in the embodiments of this application from a perspective of downlink transmission between a receive end and a transmit end.

Figure 9:
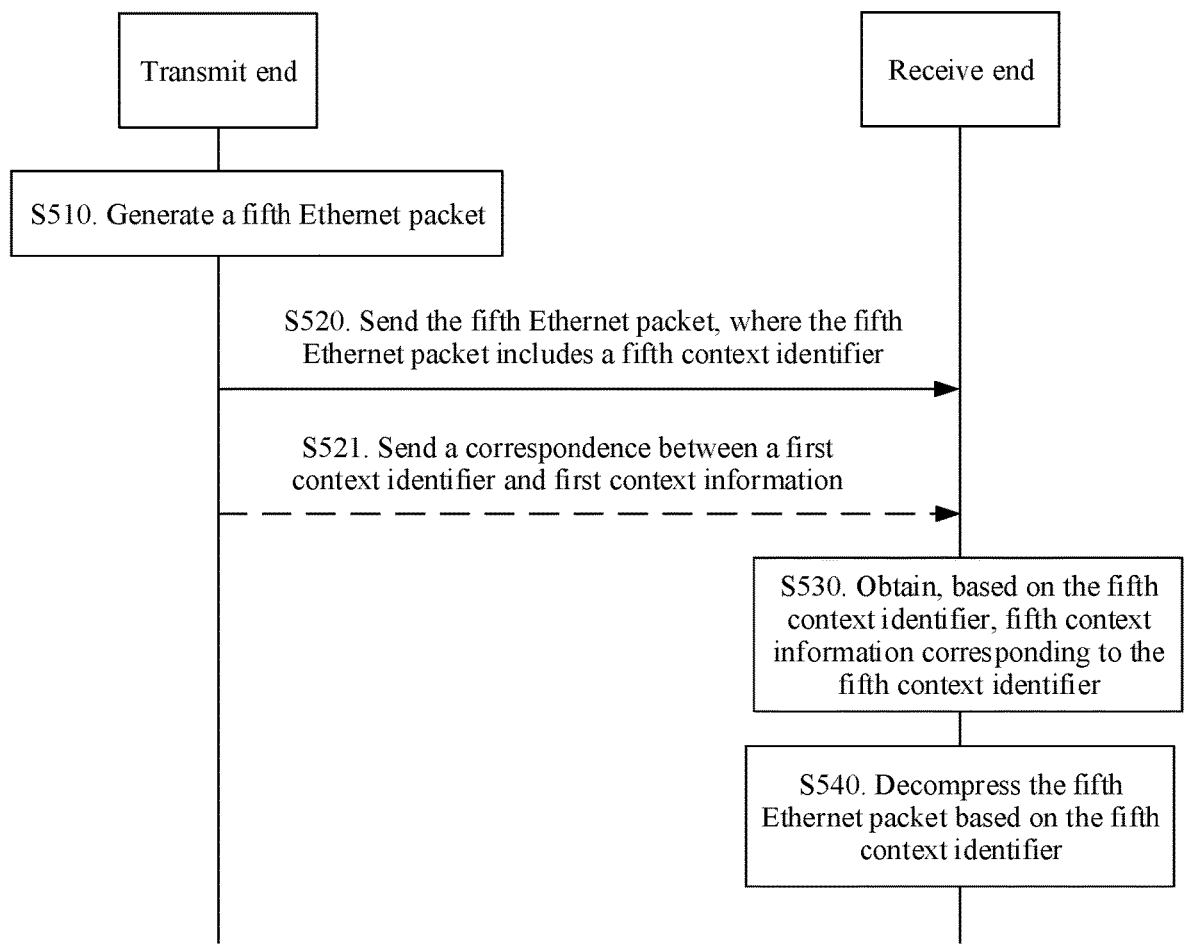
FIG. 9 is a schematic interaction diagram of another Ethernet data-based communication method according to an embodiment of this application.

FIG. 9 is a schematic interaction diagram of an Ethernet data-based communication method 500 according to an embodiment of this application.

In this method, a receive end may be a terminal device, and a transmit end is a network device. Alternatively, a receive end is a network device, and a transmit end is a terminal device.

S510. The transmit end generates a fifth Ethernet packet, where the fifth Ethernet packet includes a fifth header, the fifth header includes a fifth context identifier, and the fifth context identifier is used to identify fifth context information.

S520. The transmit end sends the fifth Ethernet packet to the receive end.

S530. The receive end obtains the fifth context information based on the fifth context identifier.

S540. The receive end decompresses the fifth Ethernet packet based on the fifth context information.

Therefore, according to the Ethernet data-based communication method in this embodiment of this application, the transmit end sends a compressed Ethernet packet (for example, the fifth Ethernet packet) to the receive end, to effectively save resources. In addition, a context identifier used to identify context information is added to a header of the Ethernet packet, so that the receive end obtains the corresponding context information by using the context identifier, to effectively ensure a probability that the receive end successfully decompresses the Ethernet packet.

Optionally, the transmit end sends a correspondence between a context identifier and context information to the receive end, where the correspondence includes the fifth correspondence between the fifth context identifier and the fifth context information.

Optionally, the transmit end sends a sixth Ethernet packet to the receive end, where the sixth Ethernet packet includes a sixth header, and the sixth header includes the correspondence between the fifth context identifier and the fifth context information.

Therefore, an uncompressed Ethernet packet (for example, the sixth Ethernet packet) carries a correspondence, to reduce signaling overheads, and save resources.

Optionally, the sixth header further includes indication information used to indicate a type of a frame format of the sixth Ethernet packet, and the type of the frame format of the sixth Ethernet packet is the same as a type of a frame format of the fifth Ethernet packet.

Therefore, a frame format is carried in an uncompressed Ethernet packet (for example, the sixth Ethernet packet), so that a system can create at least one context identifier for each frame format, and context information is identified in each frame format, so that a quantity of bits occupied by the context identifier can be reduced.

Optionally, the method further includes:

the receive end sends fifth feedback information to the transmit end, where the fifth feedback information is used to indicate that the receive end successfully receives the correspondence.

Optionally, the fifth feedback information includes the context identifier in the correspondence.

The fifth feedback information includes the fifth context identifier in the fifth correspondence.

Optionally, the method further includes:

the receive end sends sixth feedback information to the transmit end, where the sixth feedback information is used to indicate that the receive end successfully decompresses the fifth Ethernet packet.

Optionally, the transmit end is a terminal device, the receive end is a network device, and the method further includes:

the transmit end sends compression capability information to the receive end, where the compression capability information is used to indicate N Ethernet compression capabilities supported by the transmit end, and N is an integer greater than or equal to 1; and the transmit end sends compression configuration information to the receive end, where the compression configuration information is used to indicate a parameter of a fifth Ethernet compression capability, and the N Ethernet compression capabilities include the fifth Ethernet compression capability.

That the transmit end generates a fifth Ethernet packet includes:

the transmit end generates the fifth Ethernet packet based on the parameter of the fifth Ethernet compression capability.

Optionally, the transmit end is a network device, the receive end is a terminal device, and the method further includes:

the receive end sends compression capability information to the transmit end, where the compression capability information is used to indicate N Ethernet compression capabilities supported by the receive end, and N is an integer greater than or equal to 1; and the transmit end sends compression configuration information to the receive end, where the compression configuration information is used to indicate a parameter of a fifth Ethernet compression capability, and the N Ethernet compression capabilities include the fifth Ethernet compression capability.

That the transmit end generates a fifth Ethernet packet includes:

the transmit end generates the fifth Ethernet packet based on the parameter of the fifth Ethernet compression capability.

In uplink transmission, the receive end is a network device, and the transmit end is a terminal device. For the method in this embodiment of this application, refer to the method 300. For brevity, details are not described herein again. The fifth Ethernet packet in the method 500 may correspond to the first Ethernet packet in the method 300, the fifth header in the method 500 may correspond to the first header in the method 300, the fifth context identifier in the method 500 may correspond to the first context identifier in the method 300, the fifth context information in the method 500 may correspond to the first context information in the method 300, the fifth correspondence in the method 500 may correspond to the first correspondence in the method 300, the sixth Ethernet packet in the method 500 may correspond to the second Ethernet packet in the method 300, the sixth header in the method 500 may correspond to the second header in the method 300, the fifth feedback information in the method 500 may correspond to the first feedback information in the method 300, and the sixth feedback information in the method 500 may correspond to the second feedback information in the method 300.

In downlink transmission, the receive end may be a terminal device, and the transmit end is a network device. For the method in this embodiment of this application, refer to the method 400. For brevity, details are not described herein again. The fifth Ethernet packet in the method 500 may correspond to the third Ethernet packet in the method 400, the fifth header in the method 500 may correspond to the third header in the method 400, the fifth context identifier in the method 500 may correspond to the third context identifier in the method 400, the fifth context information in the method 500 may correspond to the third context information in the method 400, the fifth correspondence in the method 500 may correspond to the third correspondence in the method 400, the sixth Ethernet packet in the method 500 may correspond to the fourth Ethernet packet in the method 400, the sixth header in the method 500 may correspond to the fourth header in the method 400, the fifth feedback information in the method 500 may correspond to the third feedback information in the method 400, and the sixth feedback information in the method 500 may correspond to the fourth feedback information in the method 400.

Figure 13:
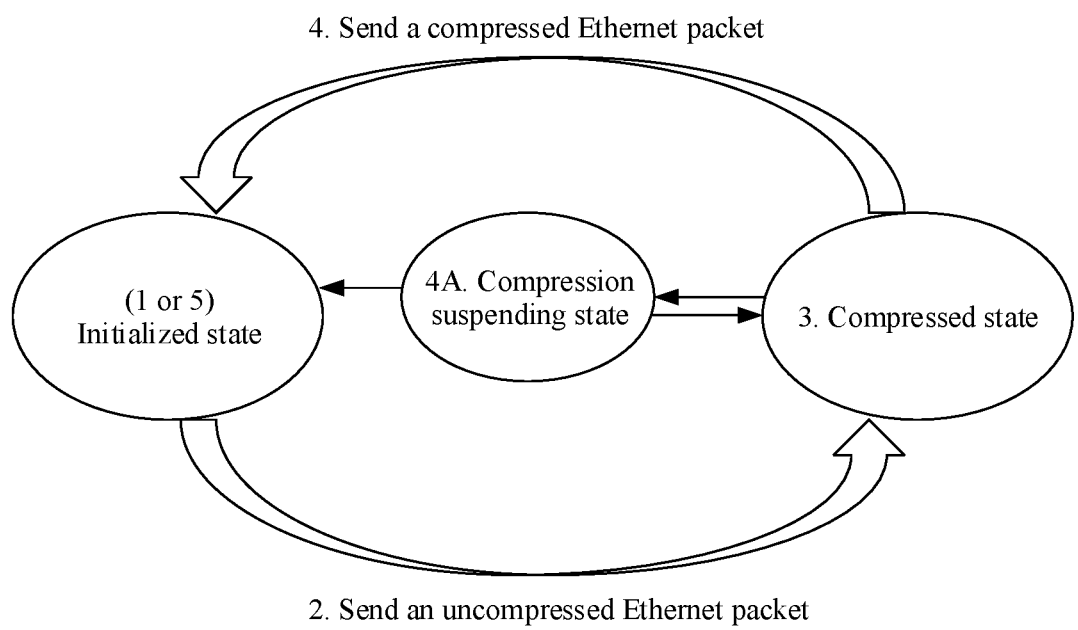
FIG. 13 is a transition diagram of an Ethernet compression status according to an embodiment of this application.

The following describes behavior conversion between sending of a compressed packet and sending of an uncompressed packet in the embodiments of this application from perspectives of a receive end and a transmit end by using a diagram of conversion between Ethernet compression states shown in FIG. 13.

1. The transmit end is in an initialization state, and the initialization state indicates that a related Ethernet compression/decompression function has been configured at the transmit end.

Optionally, before the transmit end starts compression, the transmit end may send an Ethernet compression initialization indication. After receiving the indication, the receive end starts to prepare an Ethernet compression/decompression function. For example, an initialization indication is added to a PDCP subheader, Ethernet compression signaling, MAC signaling, RRC signaling, or NAS signaling. It may be understood that an Ethernet packet subsequently received by the receive end needs to be processed by using the decompression function, and an Ethernet packet sent by the transmit end needs to be processed by the compression function.

2. As an example instead of a limitation, when any one of the following events occurs, the transmit end sends an uncompressed Ethernet packet. The uncompressed Ethernet packet may carry context information that needs to be stored by the receive end.

Optionally, the transmit end does not establish context information.

Optionally, the transmit end and the receive end are in an out-of-synchronization state.

3. As an example instead of a limitation, the transmit end changes from the initialization state to a compression state when any one of the following events occurs:

Optionally, before the transmit end starts the compression, the receive end may send an Ethernet compression start indication. After receiving the indication information, the receive end starts an Ethernet compression/decompression function. For example, a start indication is added to a PDCP subheader, Ethernet compression signaling, MAC signaling, RRC signaling, or NAS signaling. It may be understood that an Ethernet packet subsequently received by the receive end needs to be processed by using the decompression function, and an Ethernet packet sent by the transmit end needs to be processed by the compression function.

4. After determining to send a compressed Ethernet packet, the transmit end sends the compressed Ethernet packet.

4A. Compression suspended state

In this process, optionally, the receive end may send an Ethernet compression suspension indication, and after receiving the indication, the transmit end suspends an Ethernet compression behavior. For example, the Ethernet compression suspend indication is added to a PDCP subheader, Ethernet compression signaling, MAC signaling, RRC signaling, or NAS signaling.

Optionally, the receive end may send an Ethernet compression resume indication, and after receiving the indication, the receive end resumes the Ethernet compression behavior. For example, the Ethernet compression resume indication is added to a PDCP subheader, Ethernet compression signaling, MAC signaling, RRC signaling, or NAS signaling.

Optionally, if the transmit end does not receive the Ethernet compression resume indication, the transmit end changes from the compression suspended state to the initialization state.

5. The transmitter changes from the compression state to the initialization state when any of the following events occurs:

Optionally, after the terminal receives an Ethernet compression buffer reset indication, the terminal resets context information in an Ethernet compression buffer. For example, the Ethernet compression buffer reset indication is added to a PDCP subheader, Ethernet compression signaling, MAC signaling, RRC signaling, or NAS signaling. For example, when the terminal is handed over, the method is used to resynchronize the contexts of the two parties.

The foregoing describes the embodiments of the first aspect in detail with reference to FIG. 3 to FIG. 9. The following describes embodiments of the second aspect in the embodiments of this application in detail with reference to FIG. 10 and FIG. 11.

As described above, the second aspect describes a solution about how to transmit a broadcast or multicast Ethernet packet. In the embodiments of this application, two manners (namely, a manner A and a manner B) of transmitting a broadcast or multicast Ethernet packet are provided. In the manner A, an RNTI for the broadcast or multicast Ethernet packet is proposed, and the network device sends the broadcast Ethernet packet based on the RNTI. In the manner B, it is proposed that the broadcast Ethernet packet is sent in a system information block (SIB). The two manners can be used together or separately. In addition, the embodiments of the second aspect may be combined with the embodiments of the first aspect, or the embodiments of the second aspect may be used separately. The embodiments of this application are not limited thereto.

For ease of understanding, a broadcast manner and a multicast manner for sending data in the embodiments of this application are first described.

Broadcast manner: When a packet is sent in the broadcast manner, the packet is sent from a single source to all hosts on a shared Ethernet, and all hosts that receive the packet need to receive and process the packet. As an example instead of a limitation, a length of a MAC address of the broadcast Ethernet packet is 48 bits, a value of each bit is 1, and the MAC address is FF-FF-FF-FF-FF-FF in hexadecimal format.

Multicast manner: When a packet is sent in the multicast manner, the packet is sent from a source device to a group of hosts. The multicast manner may be considered as a selective broadcast manner. In the multicast manner, a multicast address is allocated to a group of hosts. The host listens to a specific multicast address, and receives and processes a packet whose destination MAC address is the multicast MAC address.

In the embodiments of this application, for brevity of description, an Ethernet packet sent in the broadcast manner may be referred to as a broadcast Ethernet packet, an Ethernet packet sent in the multicast manner may be referred to as a multicast Ethernet packet, and an Ethernet packet sent in a unicast manner may be referred to as a unicast Ethernet packet. In addition, an RNTI for the broadcast Ethernet packet may be referred to as a broadcast RNTI for short, an RNTI for the multicast Ethernet packet of the type may be referred to as a multicast RNTI for short, and an RNTI for the unicast Ethernet packet may be referred to as a unicast RNTI for short. Two descriptions may be interchanged.

In addition, because a broadcast or a multicast packet needs to be sent to a plurality of terminal devices, for ease of description, any one of the plurality of terminal devices is used as an example to describe the embodiments of this application.

Figure 10:
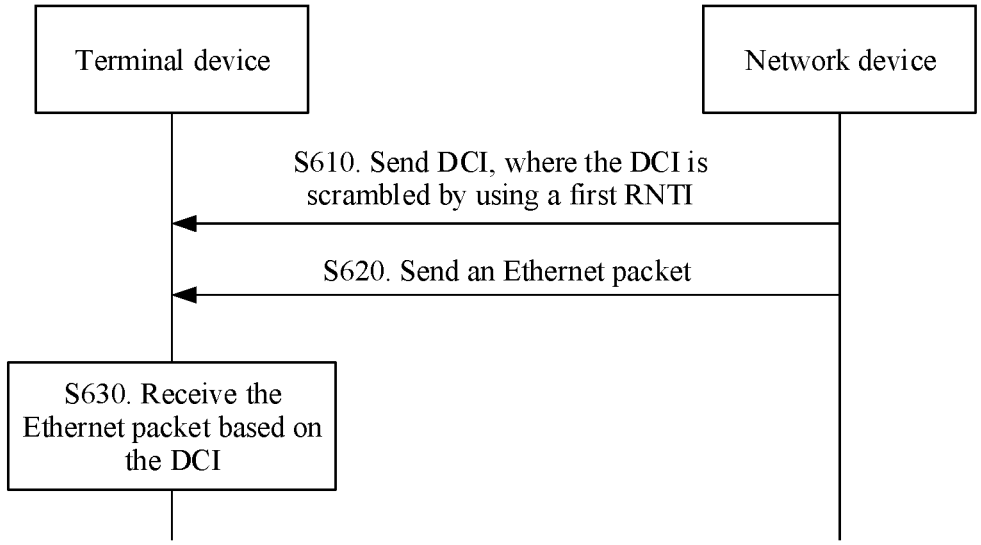
FIG. 10 is a schematic interaction diagram of another Ethernet data-based communication method according to an embodiment of this application.
Figure 11:
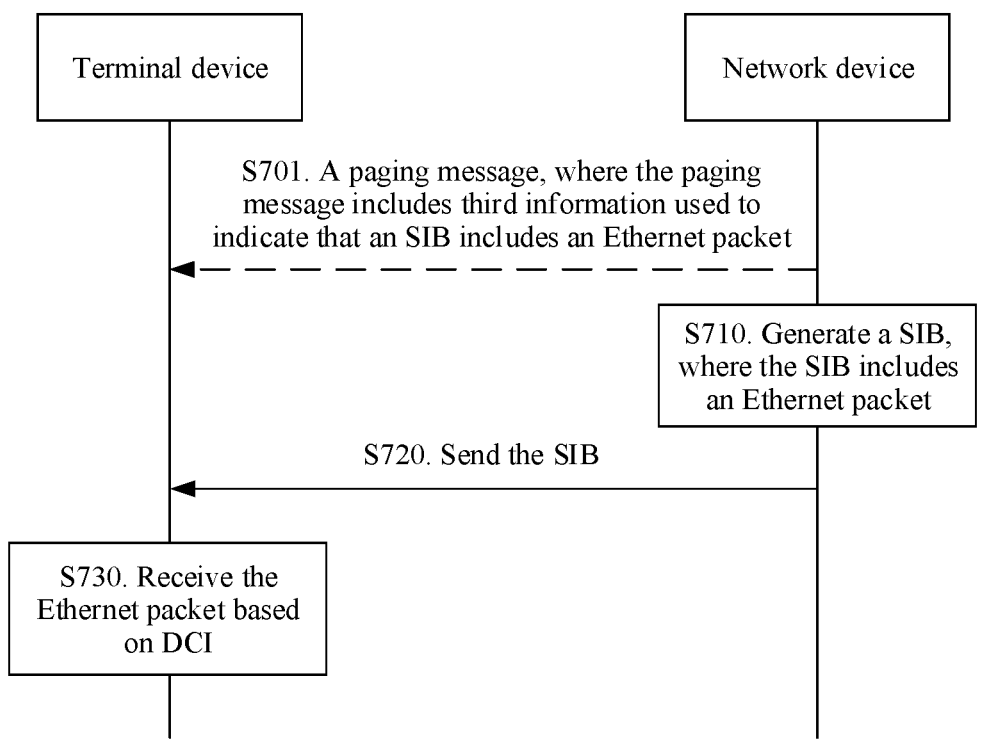
FIG. 11 is a schematic interaction diagram of another Ethernet data-based communication method according to an embodiment of this application.

The following separately describes the two manners with reference to FIG. 10 and FIG. 11.

Manner A

A network device sends a broadcast Ethernet packet based on an RNTI of a broadcast or multicast Ethernet packet.

As an example instead of a limitation, the manner A is applicable to a scenario in which a terminal device is in a connected mode.

FIG. 10 is a schematic interaction diagram of an Ethernet data-based communication method 600 according to an embodiment of this application.

In S610, the network device sends downlink control information DCI to the terminal device, where the DCI is scrambled by using a first radio network temporary identifier (RNTI), the first RNTI is an RNTI for an Ethernet packet, and the DCI includes information used to indicate a time-frequency resource carrying the Ethernet packet.

In S620, the network device sends an Ethernet packet to the terminal device.

In S630, the terminal device receives the Ethernet packet from the network device on the time-frequency resource indicated by the DCI.

In a possible implementation, the first RNTI may be a non-unicast RNTI. For example, the first RNTI may be for a multicast Ethernet packet, or may be for a broadcast Ethernet packet, or may be for an Ethernet packet of another type. This is not limited in this embodiment of this application. During implementation, for example, scheduling information (that is, DCI) used to schedule a unicast Ethernet packet is scrambled by using a second RNTI. The first RNTI is newly introduced, and DCI of a non-unicast Ethernet packet is scrambled by using the first RNTI.

Specifically, when the network device needs to schedule a non-unicast Ethernet packet, the network device may scramble, by using the first RNTI, DCI for scheduling the non-unicast Ethernet packet. After detecting and receiving the DCI, the terminal device may learn that the Ethernet packet scheduled by using the DCI is received on a time-frequency resource indicated by the DCI.

In this embodiment of this application, the first RNTI is specially used to receive the non-unicast Ethernet packet, and may be understood as an identifier of a terminal device in signal information between the terminal device and the network device. The identifier may be preconfigured on the terminal device, or may be specified in a protocol, or may be received by the terminal device from the network device. When the identifier is specified in the protocol, only a terminal device that supports an Ethernet type receives downlink scheduling information (for example, DCI) by using the identifier. When the identifier is configured, only a terminal device that receives the identifier receives downlink scheduling information by using the identifier. When the identifier is received by the terminal device from the network device, the terminal device receives the identifier by using a dedicated or broadcast message.

In a possible implementation, the first RNTI is an RNTI for a broadcast or multicast Ethernet packet.

Specifically, if the network device needs to send a broadcast Ethernet packet, the network device scrambles, by using a broadcast RNTI (for example, an RNTI 1), DCI indicating a time-frequency resource of the Ethernet packet. If the network device needs to send a multicast Ethernet packet, the network device scrambles, by using a multicast RNTI (for example, an RNTI 2), DCI indicating a time-frequency resource of the Ethernet packet. The terminal device may receive both the DCI scrambled by using the RNTI 1 and the DCI scrambled by using the RNTI 2, and determine, based on a scrambling identifier, a type of the Ethernet packet, that is, a broadcast Ethernet packet or a multicast Ethernet packet. An Ethernet packet of another type may be transmitted and received in a same manner.

As an example instead of a limitation, during implementation, there are reserved RNTIs of a plurality of types in a system. When sending an Ethernet packet, the network device may select, from the reserved RNTIs based on a type of the Ethernet packet, an RNTI corresponding to the packet type, to scramble DCI. For example, if the packet is a broadcast Ethernet packet, a broadcast RNTI (for example, an RNTI 1) may be selected from the reserved RNTIs to scramble DCI indicating a time-frequency resource of the Ethernet packet. If the packet is a multicast Ethernet packet, a multicast RNTI (for example, an RNTI2) may be selected from the reserved RNTIs to scramble DCI indicating a time-frequency resource of the Ethernet packet.

Content related to the first RNTI is separately described below from perspectives of the broadcast RNTI and the multicast RNTI.

The first RNTI is a broadcast RNTI.

If the first RNTI is a broadcast RNTI, the terminal device in a cell in a broadcast range listens to the DCI scrambled by using the first RNTI, and after receiving the DCI, receives the Ethernet packet on the time-frequency resource indicated by the DCI.

The first RNTI is the broadcast RNTI, and generally, a MAC address in the broadcast Ethernet packet is fixed, for example, FF-FF-FF-FF-FF-FF described above. In this case, it is unnecessary to add a broadcast MAC address to the packet. Therefore, this embodiment of this application provides a possible implementation:

The first RNTI is an RNTI for the broadcast Ethernet packet, and a header of the Ethernet packet does not include the broadcast media access control MAC address.

In this way, the broadcast MAC address is deleted from the broadcast Ethernet packet, to effectively save resources.

In a possible implementation, the DCI includes first information, and the first information is used to indicate that a packet scheduled by using the DCI is a broadcast Ethernet packet.

The First RNTI is a Multicast RNTI.

For the multicast RNTI, at least one multicast RNTI may be configured for at least one group of terminal devices, and one group of terminal devices correspond to one multicast RNTI. If the first RNTI is a multicast RNTI, a group of terminal devices corresponding to the first RNTI listen to the first RNTI, and after receiving the DCI, receives the Ethernet packet on the time-frequency resource indicated by the DCI.

In a possible implementation, the DCI includes first information, and the first information is used to indicate that a packet scheduled by using the DCI is a multicast Ethernet packet.

Therefore, according to the Ethernet data-based communication method in this embodiment of this application, the DCI is scrambled by using the RNTI dedicated to a broadcast type or a multicast type, so that interference to another terminal device other than the terminal device that needs to receive the DCI for the broadcast type or the multicast type can be reduced, to improve Ethernet data transmission performance.

In this embodiment of this application, when the Ethernet packet is a multicast Ethernet packet, if a multicast MAC address corresponds to the RNTI, that is, if the terminal device can determine a multicast address based on the multicast RNTI, a header of the Ethernet packet may not include the multicast MAC address. For example, one RNTI is set for each multicast group, and is used to scramble DCI in which packet scheduling information of at least one terminal device in each multicast group is located. In this way, a terminal device in the multicast group may determine, based on the RNTI corresponding to the multicast group, the multicast group corresponding to the RNTI. Therefore, the MAC address may not be carried in the header of the Ethernet packet.

When the network device is an access network device, to help the access network device identify a type of an Ethernet packet received from a core network device, a common quality of service (QoS) flow may be established between the access network device and the core network device. The common QoS flow is a QoS flow used to carry a broadcast or multicast Ethernet packet. In an implementation process, if the network device receives an Ethernet packet from the common QoS flow, it is considered that the received Ethernet packet needs to be sent by the network device to the terminal device through broadcast or multicast.

In this embodiment of this application, the DCI may not need to indicate the time-frequency resource carrying the Ethernet packet, the DCI is scrambled by using the first RNTI, and the time-frequency resource carrying the Ethernet packet is indicated by using a SIB. The terminal device receives the Ethernet packet based on the DCI and the SIB.

To enable the network device to learn whether the terminal device successfully receives the Ethernet packet, the terminal device may send feedback information to the network device. For how to specifically send the feedback information, as an example instead of a limitation, after receiving the Ethernet packet, the terminal device may send the feedback on an uplink channel such as a physical uplink shared channel (PUSCH) or a physical uplink control channel (PUCCH) in a preconfigured sequence.

The preset sequence has two meanings:

First meaning: Regardless of whether information about the terminal device appears in the broadcast or multicast Ethernet packet, after receiving the Ethernet packet, the terminal device occupies one sending feedback resource to send the feedback information.

Second meaning: Only when information about the terminal device appears in the broadcast or multicast Ethernet packet, after receiving the Ethernet packet, the terminal device occupies one sending feedback resource to send the feedback information.

Herein, the feedback resource may be determined in any one of the following manners:

The terminal device performs mapping based on a position of a radio frame in which the Ethernet packet is located, to obtain the feedback resource; or the terminal device performs mapping based on a position of a start radio frame in which the Ethernet packet is located, to obtain the feedback resource; or the terminal device performs mapping based on a position of an end radio frame in which the Ethernet packet is located, to obtain the feedback resource; or the terminal device performs mapping based on a position of a control channel element (CCE) of the DCI used for scheduling the Ethernet packet.

Manner B

A network device sends a broadcast Ethernet packet by using a SIB.

FIG. 11 is a schematic interaction diagram of an Ethernet data-based communication method 700 according to an embodiment of this application.

In S701, the network device sends a paging message, where the paging message includes indication information, and the indication information is used to indicate that the SIB includes the Ethernet packet.

In other words, the indication information is used to indicate that a type of the SIB is a type of an SIB including the Ethernet packet. Alternatively, the indication information is used to notify the terminal device that the network device sends the Ethernet packet in the SIB.

In S710, the network device generates the SIB, where the SIB includes the Ethernet packet.

As an example instead of a limitation, the SIB may further indicate an Ethernet frame format, a virtual network label, and/or a service virtual network label.

In S720, the network device sends the SIB to the terminal device.

As an example instead of a limitation, the network device may not need to send the indication information, or may not need to send the indication information in the paging message, and the terminal device only needs to directly receive the SIB message.

Therefore, according to the Ethernet data-based communication method provided in this embodiment of this application, the broadcast Ethernet packet is sent by using the SIB, so that the terminal device can be efficiently indicated to receive the Ethernet packet, thereby improving transmission efficiency.

In addition, the third information is added to the paging message, to effectively use a sending mechanism of the paging message. To be specific, the terminal device receives the paging message in a periodical time period to detect whether there is a message specific to the terminal device. This reduces design complexity, and can also improve packet receiving reliability of the terminal device.

As described in the manner A, generally, a MAC address in the broadcast Ethernet packet is fixed, for example, FF-FF-FF-FF-FF-FF described above. In this case, it is unnecessary to add a broadcast MAC address to the packet. Therefore, this embodiment of this application provides a possible implementation.

A header of the Ethernet packet does not include the broadcast media access control MAC address.

In this way, the broadcast MAC address is deleted from the broadcast Ethernet packet, to effectively save resources.

In the manner B, similar to the manner A, if the network device is an access network device, a common QoS flow may be established between the access network device and a core network device. If the access network device receives an Ethernet packet from the common QoS flow, it is considered that the received Ethernet packet needs to be sent by the network device to the terminal device through broadcast or multicast. In addition, to enable the network device to learn whether the terminal device successfully receives the Ethernet packet, the terminal device may send feedback information to the network device. For details about how to send the feedback information, refer to related descriptions in the manner A. For brevity, details are not described herein again.

In this embodiment of this application, the manner A and the manner B may be combined. For example, the network device sends downlink control information DCI to the terminal device, where the DCI is scrambled by using a first radio network temporary identifier RNTI, the first RNTI is an RNTI for an Ethernet packet, and the DCI includes information used to indicate a time-frequency resource carrying the Ethernet packet;

the network device sends a SIB to the terminal device, where the SIB includes the Ethernet packet; and the terminal device receives the SIB from the network device on the time-frequency resource indicated by the DCI. That is, in this manner, the Ethernet packet may be carried in the SIB. For description of the first RNTI, refer to the description of the first RNTI in the manner A. Details are not described herein again.

The foregoing describes the embodiments of the second aspect in detail with reference to FIG. 10 and FIG. 11. The following describes embodiments of the third aspect in the embodiments of this application in detail with reference to FIG. 12.

In the first aspect, it has been clearly pointed out that an Ethernet packet needs to carry a MAC address of the terminal device, to facilitate correct transmission of the Ethernet packet. Therefore, the network device needs to learn, in a timely manner, the MAC address of the terminal device that is communicatively connected to the network device. The third aspect proposes a solution of how to report a MAC address. The third aspect may be used in combination with at least one of the first aspect or the second aspect, or may be used independently.

In this embodiment of this application, the terminal device may send the MAC address in three cases. The following separately describes the three cases.

Case 1

The terminal device reports a MAC address after receiving request information sent by the network device.

Figure 12:
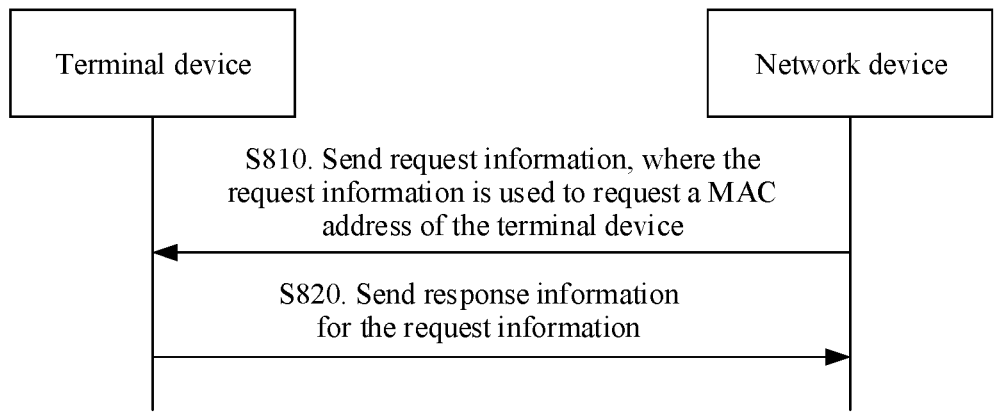
FIG. 12 is a schematic interaction diagram of another Ethernet data-based communication method according to an embodiment of this application.

FIG. 12 is a schematic interaction diagram of an Ethernet data-based communication method 800 according to an embodiment of this application.

In S810, the network device sends a request message, where the request message is used to request a media access control MAC address associated with the terminal device.

In S820, the terminal device sends the MAC address to the network device.

The MAC address associated with the terminal device may include a MAC address of the terminal device, or may include a MAC address of another terminal device that is connected to the terminal device in a wired or wireless manner. For distinguishing, the terminal device may be used as a transit terminal, and the terminal device associated with the terminal device may be used as an associated terminal. The terminal device needs to report the MAC address associated with the terminal device because, for example, in the networking system shown in FIG. 1, one terminal device may be connected to a plurality of terminal devices. For example, the terminal device 131 is connected to not only the terminal device 132, but also another terminal device, and data needs to be forwarded between the terminal device 132 and the another terminal device through the terminal device 131. To correctly transmit an Ethernet packet, as a transit terminal of the terminal device 132 and the another terminal device, the terminal device 131 also needs to report a MAC address of the another terminal device connected to the terminal device 131 to the network device.

The network device may be an access network device or a core network device. As an example instead of a limitation, if the network device is an access network device, the access network device may send dedicated RRC signaling, to request the terminal device to report a MAC address used by the terminal device. If the network device is a core network device, the core network device may send dedicated NAS signaling, to request the terminal device to report a MAC address used by the terminal device. It may be understood that the request information may be an identifier searching request of a MAC type of the terminal device.

Therefore, according to the Ethernet data-based communication method in this embodiment of this application, the network device sends, to the terminal device, request information used to request the MAC address of the terminal device, so that the terminal device can report the MAC address to the network device in a timely manner. In this way, the network device can learn of the MAC address of the terminal device in a timely manner, thereby facilitating data transmission.

For a manner of reporting the MAC address, in a possible implementation, the terminal device sends a non-access stratum NAS message, and the NAS message includes the response information.

To be specific, after registering with a mobile network and enabling NAS security protection, the terminal device may report the MAC address of the terminal device to the network device (for example, the core network device) by using a NAS message. Optionally, the core network device may send the received MAC address to the access network device. For example, the NAS message may be a tracking area update (TAU) or PDU session establishment request.

In another possible implementation, the terminal device may report the MAC address to the core network device by using a service request message or a PDN connection establishment request message. Optionally, the core network device may send the received MAC address to the access network device.

Case 2

When a media access control MAC address associated with the terminal device changes, the terminal device sends a changed MAC address to the network device.

For example, if a network adapter of an Ethernet device that is connected to the terminal device in a wired manner is changed, a MAC address usually changes. In this case, the terminal device needs to update the MAC address. Therefore, the changed MAC address needs to be reported to the network device.

For a manner of reporting the MAC address, refer to related descriptions in Case 1. For brevity, details are not described herein again.

Case 3

The terminal device periodically reports a MAC address associated with the terminal device.

As an example instead of a limitation, periodical reporting duration may be configured by the network device by using a timer, or may be configured by the terminal device by using a timer.

The terminal device may report the MAC address to the network device by using dedicated RRC signaling or dedicated NAS signaling.

For example, the MAC address is indicated in a tracking area update (TAU) message. For another example, a newly added MAC address is indicated in a TAU request message.

The foregoing describes in detail the embodiment in the third aspect, and the following describes in detail an embodiment in the fourth aspect of the embodiments of this application.

As described above, the fourth aspect describes how the network device locates and searches for the terminal device. In the fourth aspect, the network device sends a paging message to the terminal device, where the paging message carries a MAC address of a terminal device that needs to be paged, and the terminal device may determine, based on the MAC address in the received paging message, whether the MAC address is a MAC address of the terminal device or a MAC address of another terminal device connected to the terminal device. Specifically, the terminal device may determine whether the received MAC address matches a MAC address provided or allocated by a higher layer. If the received MAC address matches the MAC address provided or allocated by the higher layer, the terminal device forwards the MAC address to the higher layer. The terminal device initiates an RRC connection establishment request or connection resume request; or the terminal device indicates the another terminal device to initiate an RRC connection establishment request or connection resume request.

The foregoing describes the four aspects in the embodiments of this application in detail. The embodiments of the four aspects may be separately used or may be used in combination. The following describes a case in which at least one of the four aspects is used in combination.

The second aspect is combined with the first aspect. The broadcast or multicast Ethernet packet described in the second aspect may be the third Ethernet packet in the method 400, or may be the fifth Ethernet packet when the transmit end is a network device in the method 500 in the first aspect. It may be understood that, the first aspect describes how to compress and process an Ethernet packet, and the second aspect describes how to send the Ethernet packet in the manner A and the manner B in the second aspect if the Ethernet packet is a broadcast or multicast Ethernet packet.

The third aspect is combined with the first aspect. In the third aspect, the terminal device reports the MAC address. In the first aspect, when sending an Ethernet packet (for example, the third Ethernet packet in the method 400 or the fifth Ethernet packet when the transmit end is a network device in the method 500), the network device uses context information corresponding to the Ethernet packet to carry the reported MAC address, and uses the Ethernet packet to carry a context identifier of the corresponding context information, or uses the Ethernet packet (for example, the fourth Ethernet packet in the method 400 or the sixth Ethernet packet when the transmit end is a network device in the method 500) to carry the reported MAC address.

The third aspect is combined with the second aspect. In the third aspect, the terminal device reports the MAC address. In the second aspect, when sending the broadcast or multicast Ethernet packet, the network device uses the Ethernet packet to carry the reported MAC address.

The third aspect is combined with the second aspect and the first aspect. The broadcast or multicast Ethernet packet may be the third Ethernet packet or the fourth Ethernet packet in the method 400, or may be the fifth Ethernet packet or the sixth Ethernet packet when the transmit end is a network device in the method 500 in the first aspect. When an Ethernet packet is the third Ethernet packet in the method 400 or the fifth Ethernet packet when the transmit end is a network device in the method 500, the reported MAC address may be carried in context information corresponding to the Ethernet packet, and a context identifier of the corresponding context information is carried in the Ethernet packet. When an Ethernet packet is the fourth Ethernet packet in the method 400 or the sixth Ethernet packet when the transmit end is a network device in the method 500, the reported MAC address may be carried in the Ethernet packet.

The fourth aspect is combined with the first aspect, the second aspect, or the third aspect, and may be used to search for a terminal device in any scenario of the first aspect, the second aspect, or the third aspect when the network device is in an abnormal state.

It should be understood that sequence numbers of the foregoing processes do not indicate an execution sequence. The execution sequence of the processes should be determined based on functions and internal logic of the processes, and should not be construed as any limitation on the implementation processes of the embodiments of this application.

The foregoing describes in detail the Ethernet data-based communication method according to the embodiments of this application with reference to FIG. 1 to FIG. 13. The following describes in detail an Ethernet data-based apparatus according to the embodiments of this application with reference to FIG. 14 and FIG. 15.

Figure 14:
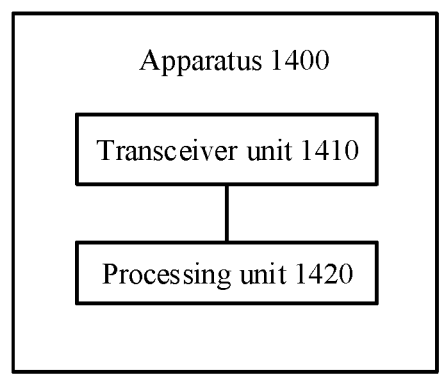
FIG. 14 shows an Ethernet data-based apparatus according to an embodiment of this application.

FIG. 14 shows an apparatus 1400 used for Ethernet data according to an embodiment of this application. The apparatus 1400 may be a terminal device, or a chip in a terminal device. The apparatus 1400 may be a network device or a chip in a network device. The apparatus 1400 includes a transceiver unit 1410 and a processing unit 1420.

In a possible implementation, the apparatus 1400 is configured to perform procedures and steps corresponding to the terminal device in the method 300.

The transceiver unit 1410 is configured to receive compression configuration information from a network device, where the compression configuration information is used to indicate a parameter of a first Ethernet compression capability. The processing unit 1420 is configured to generate a first Ethernet packet based on the parameter of the first Ethernet compression capability. The transceiver unit 1410 is further configured to send the first Ethernet packet to the network device.

Optionally, the transceiver unit 1410 is further configured to send compression capability information to the network device, where the compression capability information is used to indicate N Ethernet compression capabilities supported by the apparatus, the N Ethernet compression capabilities include the first Ethernet compression capability, and N is an integer greater than or equal to 1.

Optionally, the parameter of the first Ethernet compression capability includes an enabling parameter, and the enabling parameter is used to indicate the apparatus to use the first Ethernet compression capability.

Optionally, the parameter of the first Ethernet compression capability includes a frame format parameter used to indicate a first frame format or an algorithm parameter used to indicate a compression algorithm of a first frame format, and the first frame format is a frame format of the first Ethernet packet.

Optionally, the first Ethernet packet includes a first header, the first header includes a first context identifier, and the first context identifier is used to identify the first context information.

Optionally, the transceiver unit 1410 is further configured to send a first correspondence between the first context identifier and the first context information to the network device.

Optionally, the transceiver unit 1410 is further configured to send a second Ethernet packet to the network device, where the second Ethernet packet includes a second header, and the second header includes the first correspondence.

Optionally, the second header further includes a frame format of the second Ethernet packet, and the frame format of the second Ethernet packet is the same as the frame format of the first Ethernet packet.

Optionally, the transceiver unit 1410 is further configured to send a correspondence between a context identifier and context information to the network device, where the correspondence includes the first correspondence.

Optionally, the transceiver unit 1410 is further configured to receive first feedback information from the network device, where the first feedback information is used to indicate that the network device successfully receives the first correspondence.

Optionally, the first feedback information includes the first context identifier.

Optionally, the transceiver unit 1410 is further configured to receive second feedback information from the network device, where the second feedback information is used to indicate that the network device successfully decompresses the first Ethernet packet.

In another possible implementation, the apparatus 1400 is configured to perform procedures and steps corresponding to the network device in the method 300.

The transceiver unit 1410 is configured to send compression configuration information to a terminal device, where the compression configuration information is used to indicate a parameter of a first Ethernet compression capability; and receive a first Ethernet packet, where the first Ethernet packet is generated based on the parameter of the first Ethernet compression capability. The processing unit 1420 is configured to decompress the first Ethernet packet.

Optionally, the transceiver unit 1410 is further configured to receive compression capability information from the terminal device, where the compression capability information is used to indicate N Ethernet compression capabilities supported by the terminal device, the N Ethernet compression capabilities include the first Ethernet compression capability, and N is an integer greater than or equal to 1.

Optionally, the parameter of the first Ethernet compression capability includes an enabling parameter, and the enabling parameter is used to indicate the terminal device to use the first Ethernet compression capability.

Optionally, the parameter of the first Ethernet compression capability includes a frame format parameter used to indicate a first frame format and/or an algorithm parameter used to indicate a compression algorithm of the first frame format, and the first frame format is a frame format of the first Ethernet packet.

Optionally, the first Ethernet packet includes a first header, the first header includes a first context identifier, and the first context identifier is used to identify first context information. The processing unit 1420 is further configured to obtain the first context information based on the first context identifier, and decompress the first Ethernet packet based on the first context information.

Optionally, the transceiver unit 1410 is further configured to receive a first correspondence between the first context identifier and the first context information from the terminal device.

Optionally, the transceiver unit 1410 is further configured to receive a second Ethernet packet from the terminal device, where the second Ethernet packet includes a second header, and the second header includes the first correspondence.

Optionally, the second header further includes a frame format of the second Ethernet packet, and the frame format of the second Ethernet packet is the same as the frame format of the first Ethernet packet.

Optionally, the transceiver unit 1410 is further configured to receive a correspondence between a context identifier and context information from the terminal device, where the correspondence includes the first correspondence.

Optionally, the transceiver unit 1410 is further configured to send first feedback information to the terminal device, where the first feedback information is used to indicate that the apparatus successfully receives the first correspondence.

Optionally, the first feedback information includes the first context identifier.

Optionally, the transceiver unit 1410 is further configured to send second feedback information to the terminal device, where the second feedback information is used to indicate that the apparatus successfully decompresses the first Ethernet packet.

In another possible implementation, the apparatus 1400 is configured to perform procedures and steps corresponding to the terminal device in the method 400.

The transceiver unit 1410 is configured to receive compression configuration information from a network device, where the compression configuration information is used to indicate a parameter of a third Ethernet compression capability; and receive a third Ethernet packet from the network device, where the third Ethernet packet is generated based on the parameter of the third Ethernet compression capability. The processing unit 1420 is configured to decompress the third Ethernet packet.

Optionally, the transceiver unit 1410 is further configured to send compression capability information to the network device, where the compression capability information is used to indicate N Ethernet compression capabilities supported by the apparatus, the N Ethernet compression capabilities include the third Ethernet compression capability, and N is an integer greater than or equal to 1.

Optionally, the parameter of the third Ethernet compression capability includes an enabling parameter, and the enabling parameter is used to indicate the apparatus to use the third Ethernet compression capability.

Optionally, the parameter of the third Ethernet compression capability includes a frame format parameter used to indicate a third frame format or an algorithm parameter used to indicate a compression algorithm of a third frame format, and the third frame format is a frame format of the third Ethernet packet.

Optionally, the third Ethernet packet includes a third header, the third header includes a third context identifier, and the third context identifier is used to identify third context information. The processing unit 1420 is further configured to obtain the third context information based on the third context identifier, and decompress the third Ethernet packet based on the third context information.

Optionally, the transceiver unit 1410 is further configured to receive a third correspondence between the third context identifier and the third context information from the network device.

Optionally, the transceiver unit 1410 is further configured to receive a fourth Ethernet packet from the network device, where the fourth Ethernet packet includes a fourth header, and the fourth header includes the third correspondence.

Optionally, the fourth header further includes a frame format of the fourth Ethernet packet, and the frame format of the fourth Ethernet packet is the same as the frame format of the third Ethernet packet.

Optionally, the transceiver unit 1410 is further configured to receive a correspondence between a context identifier and context information from the network device, where the correspondence includes the third correspondence.

Optionally, the transceiver unit 1410 is further configured to send third feedback information to the network device, where the third feedback information is used to indicate that the apparatus successfully receives the third correspondence.

Optionally, the third feedback information includes the third context identifier.

Optionally, the transceiver unit 1410 is further configured to send fourth feedback information to the network device, where the fourth feedback information is used to indicate that the apparatus successfully decompresses the third Ethernet packet.

In another possible implementation, the apparatus 1400 is configured to perform procedures and steps corresponding to the network device in the method 400.

The transceiver unit 1410 is configured to send compression configuration information to a terminal device, where the compression configuration information is used to indicate a parameter of a third Ethernet compression capability. The processing unit 1420 is configured to generate a third Ethernet packet based on the parameter of the third Ethernet compression capability. The transceiver unit 1410 is further configured to send the third Ethernet packet to the terminal device.

Optionally, the transceiver unit 1410 is further configured to receive compression capability information from the terminal device, where the compression capability information is used to indicate N Ethernet compression capabilities supported by the terminal device, the N Ethernet compression capabilities include the third Ethernet compression capability, and N is an integer greater than or equal to 1.

Optionally, the parameter of the third Ethernet compression capability includes an enabling parameter, and the enabling parameter is used to indicate the terminal device to use the third Ethernet compression capability.

Optionally, the parameter of the third Ethernet compression capability includes a frame format parameter used to indicate a third frame format and/or an algorithm parameter used to indicate a compression algorithm of the third frame format, and the third frame format is a frame format of the third Ethernet packet.

Optionally, the third Ethernet packet includes a third header, the third header includes a third context identifier, and the third context identifier is used to identify the third context information.

Optionally, the transceiver unit 1410 is further configured to send a third correspondence between the third context identifier and the third context information to the terminal device.

Optionally, the transceiver unit 1410 is further configured to send a fourth Ethernet packet to the terminal device, where the fourth Ethernet packet includes a fourth header, and the fourth header includes the third correspondence.

Optionally, the fourth header further includes a frame format of the fourth Ethernet packet, and the frame format of the fourth Ethernet packet is the same as the frame format of the third Ethernet packet.

Optionally, the transceiver unit 1410 is further configured to send a correspondence between a context identifier and context information to the terminal device, where the correspondence includes the third correspondence.

Optionally, the transceiver unit 1410 is further configured to receive third feedback information from the terminal device, where the third feedback information is used to indicate that the terminal device successfully receives the third correspondence.

Optionally, the third feedback information includes the third context identifier.

Optionally, the transceiver unit 1410 is further configured to receive fourth feedback information from the terminal device, where the fourth feedback information is used to indicate that the terminal device successfully decompresses the third Ethernet packet.

In another possible implementation, the apparatus 1400 is configured to perform procedures and steps corresponding to the transmit end in the method 500.

The processing unit 1420 is configured to generate a fifth Ethernet packet, where the fifth Ethernet packet includes a fifth header, the fifth header includes a fifth context identifier, and the fifth context identifier is used to identify fifth context information. The transceiver unit 1410 is configured to send the fifth Ethernet packet to a receive end.

Optionally, the transceiver unit 1410 is further configured to send a correspondence between a context identifier and context information to the receive end, where the correspondence includes a fifth correspondence between the fifth context identifier and the fifth context information.

Optionally, the transceiver unit 1410 is further configured to send a sixth Ethernet packet to the receive end, where the sixth Ethernet packet includes a sixth header, and the sixth header includes the correspondence between the fifth context identifier and the fifth context information.

Optionally, the sixth header further includes indication information used to indicate a type of a frame format of the sixth Ethernet packet, and the type of the frame format of the sixth Ethernet packet is the same as a type of a frame format of the fifth Ethernet packet.

Optionally, the transceiver unit 1410 is further configured to receive fifth feedback information from the receive end, where the fifth feedback information is used to indicate that the receive end successfully receives the correspondence.

Optionally, the fifth feedback information includes the context identifier in the correspondence.

Optionally, the transceiver unit 1410 is further configured to receive sixth feedback information from the receive end, where the sixth feedback information is used to indicate that the receive end successfully decompresses the fifth Ethernet packet.

Optionally, the apparatus is a terminal device, the receive end is a network device, and the transceiver unit 1410 is further configured to:

receive compression configuration information from the receive end, where the compression configuration information is used to indicate a parameter of a fifth Ethernet compression capability; and generate the fifth Ethernet packet based on the parameter of the fifth Ethernet compression capability.

Optionally, the transceiver unit 1410 is further configured to send compression capability information to the receive end, where the compression capability information is used to indicate N Ethernet compression capabilities supported by the apparatus, the N Ethernet compression capabilities include the fifth Ethernet compression capability, and N is an integer greater than or equal to 1.

Optionally, the apparatus is a network device, the receive end is a terminal device, and the transceiver unit 1410 is further configured to send compression configuration information to the receive end, where the compression configuration information is used to indicate a parameter of a fifth Ethernet compression capability; and generate the fifth Ethernet packet based on the parameter of the fifth Ethernet compression capability.

Optionally, the transceiver unit 1410 is further configured to receive compression capability information from the receive end, where the compression capability information is used to indicate N Ethernet compression capabilities supported by the receive end, the N Ethernet compression capabilities include the fifth Ethernet compression capability, and N is an integer greater than or equal to 1.

In another possible implementation, the apparatus 1400 is configured to perform procedures and steps corresponding to the receive end in the method 500.

The transceiver unit 1410 is configured to receive a fifth Ethernet packet, where the fifth Ethernet packet includes a fifth header, the fifth header includes a fifth context identifier, and the fifth context identifier is used to identify fifth context information. The processing unit 1420 is configured to obtain the fifth context information based on the fifth context identifier. The processing unit 1420 is further configured to decompress the fifth Ethernet packet based on the fifth context information.

Optionally, the transceiver unit 1410 is further configured to receive a correspondence between a context identifier and context information, where the correspondence includes a fifth correspondence between the fifth context identifier and the fifth context information. The processing unit 1420 is specifically configured to obtain the fifth context information based on the fifth context identifier and the fifth correspondence.

Optionally, the transceiver unit 1410 is further configured to receive a sixth Ethernet packet, where the sixth Ethernet packet includes a sixth header, and the sixth header includes the correspondence between the fifth context identifier and fifth context information. The processing unit 1420 is specifically configured to obtain the fifth context information based on the fifth context identifier and the fifth correspondence.

Optionally, the sixth header further includes indication information used to indicate a type of a frame format of the sixth Ethernet packet, and the type of the frame format of the sixth Ethernet packet is the same as a type of a frame format of the fifth Ethernet packet.

Optionally, the transceiver unit 1410 is further configured to send fifth feedback information, where the fifth feedback information is used to indicate that the apparatus successfully receives the correspondence.

Optionally, the fifth feedback information includes the context identifier in the correspondence.

Optionally, the transceiver unit 1410 is further configured to send sixth feedback information, where the sixth feedback information is used to indicate that the apparatus successfully decompresses the fifth Ethernet packet.

Optionally, the apparatus is a network device, the transmit end is a terminal device, and the transceiver unit 1410 is further configured to:

send compression configuration information to the transmit end, where the compression configuration information is used to indicate a parameter of a fifth Ethernet compression capability, and the fifth Ethernet packet is generated based on the parameter of the fifth Ethernet compression capability.

Optionally, the transceiver unit 1410 is further configured to receive compression capability information from the transmit end, where the compression capability information is used to indicate N Ethernet compression capabilities supported by the transmit end, the N Ethernet compression capabilities include the fifth Ethernet compression capability, and N is an integer greater than or equal to 1.

Optionally, the apparatus is a terminal device, and the transmit end is a network device. The transceiver unit 1410 is further configured to receive compression configuration information from the transmit end, where the compression configuration information is used to indicate a parameter of a fifth Ethernet compression capability, and the fifth Ethernet packet is generated based on the parameter of the fifth Ethernet compression capability.

Optionally, the transceiver unit 1410 is further configured to receive compression capability information from the transmit end, where the compression capability information is used to indicate N Ethernet compression capabilities supported by the transmit end, the N Ethernet compression capabilities include the fifth Ethernet compression capability, and N is an integer greater than or equal to 1.

In another possible implementation, the apparatus 1400 is configured to perform procedures and steps corresponding to the terminal device in the method 600.

The transceiver unit 1410 is configured to receive downlink control information DCI from a network device, where the DCI is scrambled by using a first radio network temporary identifier RNTI, the first RNTI is an RNTI for an Ethernet packet, and the DCI includes information used to indicate a time-frequency resource carrying the Ethernet packet. The transceiver unit 1410 is further configured to receive the Ethernet packet from the network device on the time-frequency resource indicated by the DCI.

Optionally, the transceiver unit 1410 is specifically configured to receive a system information block SIB from the network device on the time-frequency resource indicated by the DCI, where the SIB includes the Ethernet packet.

Optionally, the first RNTI is an RNTI for a broadcast or a multicast Ethernet packet.

Optionally, the DCI includes first information, and the first information is used to indicate that a packet scheduled by using the DCI is a broadcast or multicast Ethernet packet.

Optionally, when the Ethernet packet is a broadcast Ethernet packet, a header of the Ethernet packet does not include a broadcast media access control MAC address.

Optionally, the transceiver unit 1410 is further configured to send, to the network device, a media access control MAC address associated with the apparatus.

Optionally, the transceiver unit 1410 is specifically configured to send a non-access stratum NAS message to the network device, where the NAS message includes the MAC address.

Optionally, the transceiver unit 1410 is further configured to receive a request message from the network device, where the request message is used to request the MAC address associated with the apparatus.

Optionally, the transceiver unit 1410 is further configured to: when the MAC address associated with the apparatus changes, send a changed MAC address to the network device.

Optionally, the transceiver unit 1410 is further configured to send compression capability information to the network device, where the compression capability information is used to indicate N Ethernet compression capabilities supported by the apparatus, and N is an integer greater than or equal to 1; and receive compression configuration information from the network device, where the compression configuration information is used to indicate a parameter of a first Ethernet compression capability, and the N Ethernet compression capabilities include the first Ethernet compression capability. The apparatus further includes the processing unit 1420, configured to decompress the Ethernet packet, where the Ethernet packet is generated based on the parameter of the first Ethernet compression capability.

Optionally, the Ethernet packet includes a first header, the first header includes a first context identifier, and the first context identifier is used to identify first context information. The transceiver unit 1410 is further configured to obtain the first context information based on the first context identifier, and the processing unit 1420 is specifically configured to decompress the Ethernet packet based on the first context information.

In another possible implementation, the apparatus 1400 is configured to perform procedures and steps corresponding to the network device in the method 600.

The transceiver unit 1410 is configured to send downlink control information DCI to a terminal device, where the DCI is scrambled by using a first radio network temporary identifier RNTI, the first RNTI is an RNTI for an Ethernet packet, and the DCI includes information used to indicate a time-frequency resource carrying the Ethernet packet. The transceiver unit 1410 is further configured to send the Ethernet packet to the terminal device on the time-frequency resource.

Optionally, the transceiver unit 1410 is specifically configured to send a system information block SIB to the terminal device on the time-frequency resource, where the SIB includes the Ethernet packet.

Optionally, the first RNTI is an RNTI for a broadcast or a multicast Ethernet packet.

Optionally, the DCI includes first information, and the first information is used to indicate that a packet scheduled by using the DCI is a broadcast or multicast Ethernet packet.

Optionally, the apparatus is an access network device, and a common quality of service QoS flow is established between the access network device and a core network device. The transceiver unit 1410 is further configured to receive the Ethernet packet from the common QoS flow.

Optionally, the transceiver unit 1410 is further configured to receive, from the terminal device, a media access control MAC address associated with the terminal device.

Optionally, the transceiver unit 1410 is specifically configured to receive a non-access stratum NAS message from the terminal device, where the NAS message includes the MAC address.

Optionally, the transceiver unit 1410 is further configured to send a request message to the terminal device, where the request message is used to request the MAC address associated with the terminal device.

Optionally, the transceiver unit 1410 is further configured to receive compression capability information from the terminal device, where the compression capability information is used to indicate N Ethernet compression capabilities supported by the terminal device, and N is an integer greater than or equal to 1; and send compression configuration information to the terminal device, where the compression configuration information is used to indicate a parameter of a first Ethernet compression capability, and the N Ethernet compression capabilities include the first Ethernet compression capability. The apparatus further includes the processing unit 1420, configured to generate the Ethernet packet based on the parameter of the first Ethernet compression capability.

Optionally, the Ethernet packet includes a first header, the first header includes a first context identifier, and the first context identifier is used to identify the first context information.

In another possible implementation, the apparatus 1400 is configured to perform procedures and steps corresponding to the terminal device in the method 700.

The transceiver unit 1410 is configured to receive a system information block SIB from a network device, where the SIB includes an Ethernet packet. The processing unit 1420 is configured to obtain the Ethernet packet from the SIB.

Optionally, the transceiver unit 1410 is further configured to receive a paging message from the network device, where the paging message includes indication information, and the indication information is used to indicate that the SIB includes the Ethernet packet.

Optionally, the transceiver unit 1410 is further configured to receive downlink control information DCI from the network device, where the DCI is scrambled by using a first radio network temporary identifier RNTI, the first RNTI is an RNTI for an Ethernet packet, and the DCI includes information used to indicate a time-frequency resource carrying the Ethernet packet.

Optionally, the DCI includes first information, and the first information is used to indicate that a packet scheduled by using the DCI is a broadcast or multicast Ethernet packet.

Optionally, when the Ethernet packet is a broadcast Ethernet packet, a header of the Ethernet packet does not include a broadcast media access control MAC address.

Optionally, the transceiver unit 1410 is further configured to send, to the network device, a media access control MAC address associated with the apparatus.

Optionally, the transceiver unit 1410 is specifically configured to send a non-access stratum NAS message to the network device, where the NAS message includes the MAC address.

Optionally, the transceiver unit 1410 is further configured to receive a request message from the network device, where the request message is used to request the MAC address associated with the apparatus.

Optionally, the transceiver unit 1410 is specifically configured to: when the MAC address associated with the apparatus changes, send a changed MAC address to the network device.

Optionally, the transceiver unit 1410 is further configured to send compression capability information to the network device, where the compression capability information is used to indicate N Ethernet compression capabilities supported by the apparatus, and N is an integer greater than or equal to 1; and receive compression configuration information from the network device, wherein the compression configuration information is used to indicate a parameter of a first Ethernet compression capability, and the N Ethernet compression capabilities include the first Ethernet compression capability. The processing unit 1420 is further configured to decompress the Ethernet packet, where the Ethernet packet is generated based on the parameter of the first Ethernet compression capability.

Optionally, the Ethernet packet includes a first header, the first header includes a first context identifier, and the first context identifier is used to identify first context information. The transceiver unit 1410 is further configured to obtain the first context information based on the first context identifier, and the processing unit 1420 is specifically configured to decompress the Ethernet packet based on the first context information.

In another possible implementation, the apparatus 1400 is configured to perform procedures and steps corresponding to the network device in the method 700.

The processing unit 1420 is configured to generate a system information block SIB, where the SIB includes an Ethernet packet. The transceiver unit 1410 is configured to send the SIB.

Optionally, the transceiver unit 1410 is further configured to send a paging message to the terminal device, where the paging message includes indication information, and the indication information is used to indicate that the SIB includes the Ethernet packet.

Optionally, the transceiver unit 1410 is further configured to send downlink control information DCI to the terminal device, where the DCI is scrambled by using a first radio network temporary identifier RNTI, the first RNTI is an RNTI for an Ethernet packet, and the DCI includes information used to indicate a time-frequency resource carrying the Ethernet packet.

Optionally, the DCI includes first information, and the first information is used to indicate that a packet scheduled by using the DCI is a broadcast or multicast Ethernet packet.

Optionally, when the Ethernet packet is a broadcast Ethernet packet, a header of the Ethernet packet does not include a broadcast media access control MAC address.

Optionally, the transceiver unit 1410 is further configured to receive, from the terminal device, a media access control MAC address associated with the terminal device.

Optionally, the transceiver unit 1410 is specifically configured to receive a non-access stratum NAS message from the terminal device, where the NAS message includes the MAC address.

Optionally, the transceiver unit 1410 is further configured to send a request message to the terminal device, where the request message is used to request the MAC address associated with the terminal device.

Optionally, the transceiver unit 1410 is further configured to receive compression capability information from the terminal device, where the compression capability information is used to indicate N Ethernet compression capabilities supported by the terminal device, and N is an integer greater than or equal to 1; and send compression configuration information to the terminal device, wherein the compression configuration information is used to indicate a parameter of a first Ethernet compression capability, and the N Ethernet compression capabilities include the first Ethernet compression capability. The processing unit 1420 is further configured to generate the Ethernet packet based on the parameter of the first Ethernet compression capability.

Optionally, the Ethernet packet includes a first header, the first header includes a first context identifier, and the first context identifier is used to identify the first context information.

In another possible implementation, the apparatus 1400 is configured to perform procedures and steps corresponding to the terminal device in the method 800.

The transceiver unit 1410 is configured to receive a request message from a network device, where the request message is used to request a media access control MAC address associated with the apparatus. The transceiver unit 1410 is further configured to send the MAC address to the network device.

Optionally, the transceiver unit 1410 is specifically configured to send a non-access stratum NAS message, where the NAS message includes the MAC address.

In another possible implementation, the apparatus 1400 is configured to perform procedures and steps corresponding to the network device in the method 800.

The transceiver unit 1410 is configured to send a request message to a terminal device, where the request message is used to request a media access control MAC address associated with the terminal device. The transceiver unit 1410 is further configured to receive the MAC address from the terminal device.

Optionally, the transceiver unit 1410 is specifically configured to receive a non-access stratum NAS message from the terminal device, where the NAS message includes the MAC address.

It should be understood that the apparatus 1400 herein is presented in a form of a function unit. The term "unit" herein may refer to an application-specific integrated circuit (ASIC), an electronic circuit, a processor (for example, a shared processor, a special purpose processor, or a group processor) configured to execute one or more software or firmware programs, a memory, a merge logic circuit, and/or another suitable component that supports the described function. In an optional example, a person skilled in the art may understand that the apparatus 1400 may be specifically the terminal device or the network device (respectively used as a transmit end or a receive end) in the foregoing embodiments, and the apparatus 1400 may be configured to perform the procedures and/or steps corresponding to the terminal device or the network device in the foregoing method embodiments. To avoid repetition, details are not described herein again.

The apparatus 1400 in each of the foregoing solutions has functions of implementing the corresponding steps performed by the terminal device or the network device (respectively used as a transmit end or a receive end) in the foregoing methods. The function may be implemented by hardware, or may be implemented by hardware by executing corresponding software. The hardware or the software includes one or more modules corresponding to the foregoing functions. For example, a sending unit may be replaced with a transmitter, a receiving unit may be replaced with a receiver, and another unit such as a determining unit may be replaced with a processor, to respectively perform a sending operation, a receiving operation, and a related processing operation in the method embodiments.

In the embodiments of this application, the apparatus in FIG. 14 may alternatively be a chip or a chip system, for example, a system on chip (SoC). Correspondingly, the receiving unit and the sending unit may be a transceiver circuit of the chip. This is not limited herein.

Figure 15:
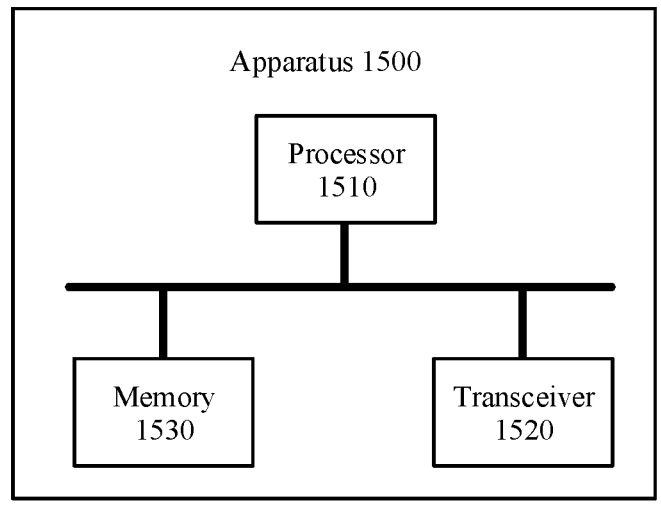
FIG. 15 shows another Ethernet data-based apparatus according to an embodiment of this application.

FIG. 15 shows another apparatus 1500 used for Ethernet data according to an embodiment of this application. The apparatus 1500 includes a processor 1510, a transceiver 1520, and a memory 1530. The processor 1510, the transceiver 1520, and the memory 1530 communicate with each other through an internal connection path. The memory 1530 is configured to store an instruction. The processor 1510 is configured to execute the instruction stored in the memory 1530, to control the transceiver 1520 to send a signal and/or receive a signal.

In a possible implementation, the apparatus 1500 is configured to perform the procedures and steps corresponding to the terminal device in the method 300.

The transceiver 1520 is configured to receive compression configuration information from a network device, where the compression configuration information is used to indicate a parameter of a first Ethernet compression capability. The processor 1510 is configured to generate a first Ethernet packet based on the parameter of the first Ethernet compression capability. The transceiver 1520 is further configured to send the first Ethernet packet to the network device.

In another possible implementation, the apparatus 1500 is configured to perform procedures and steps corresponding to the network device in the method 300.

The transceiver 1520 is configured to send compression configuration information to a terminal device, where the compression configuration information is used to indicate a parameter of a first Ethernet compression capability; and receive a first Ethernet packet, where the first Ethernet packet is generated based on the parameter of the first Ethernet compression capability. The processor 1510 is configured to decompress the first Ethernet packet.

In another possible implementation, the apparatus 1500 is configured to perform the procedures and steps corresponding to the terminal device in the method 400.

The transceiver 1520 is configured to receive compression configuration information from a network device, where the compression configuration information is used to indicate a parameter of a third Ethernet compression capability; and receive a third Ethernet packet from the network device, where the third Ethernet packet is generated based on the parameter of the third Ethernet compression capability. The processor 1510 is configured to decompress the third Ethernet packet.

In another possible implementation, the apparatus 1500 is configured to perform the procedures and steps corresponding to the network device in the method 400.

The transceiver 1520 is configured to send compression configuration information to a terminal device, where the compression configuration information is used to indicate a parameter of a third Ethernet compression capability. The processor 1510 is configured to generate a third Ethernet packet based on the parameter of the third Ethernet compression capability. The transceiver 1520 is further configured to send the third Ethernet packet to the terminal device.

In another possible implementation, the apparatus 1500 is configured to perform the procedures and steps corresponding to the transmit end in the method 500.

The processor 1510 is configured to generate a fifth Ethernet packet, where the fifth Ethernet packet includes a fifth header, the fifth header includes a fifth context identifier, and the fifth context identifier is used to identify fifth context information. The transceiver 1520 is configured to send the fifth Ethernet packet to a receive end.

In another possible implementation, the apparatus 1500 is configured to perform the procedures and steps corresponding to the receive end in the method 500.

The transceiver 1520 is configured to receive a fifth Ethernet packet, where the fifth Ethernet packet includes a fifth header, the fifth header includes a fifth context identifier, and the fifth context identifier is used to identify fifth context information. The processor 1510 is configured to obtain the fifth context information based on the fifth context identifier. The processor 1510 is further configured to decompress the fifth Ethernet packet based on the fifth context information.

In another possible implementation, the apparatus 1500 is configured to perform the procedures and steps corresponding to the terminal device in the method 600.

The transceiver 1520 is configured to receive downlink control information DCI from a network device, where the DCI is scrambled by using a first radio network temporary identifier RNTI, the first RNTI is an RNTI for an Ethernet packet, and the DCI includes information used to indicate a time-frequency resource carrying the Ethernet packet. The transceiver 1520 is further configured to receive the Ethernet packet from the network device on the time-frequency resource indicated by the DCI.

In another possible implementation, the apparatus 1500 is configured to perform the procedures and steps corresponding to the network device in the method 600.

The transceiver 1520 is configured to send downlink control information DCI to a terminal device, where the DCI is scrambled by using a first radio network temporary identifier RNTI, the first RNTI is an RNTI for an Ethernet packet, and the DCI includes information used to indicate a time-frequency resource carrying the Ethernet packet. The transceiver 1520 is further configured to send the Ethernet packet to the terminal device on the time-frequency resource.

In another possible implementation, the apparatus 1500 is configured to perform the procedures and steps corresponding to the terminal device in the method 700.

The transceiver 1520 is configured to receive a system information block SIB from a network device, where the SIB includes an Ethernet packet. The processor 1510 is configured to obtain the Ethernet packet from the SIB.

In another possible implementation, the apparatus 1500 is configured to perform the procedures and steps corresponding to the network device in the method 700.

The processor 1510 is configured to generate a system information block SIB, where the SIB includes an Ethernet packet. The transceiver 1520 is configured to send the SIB.

In another possible implementation, the apparatus 1500 is configured to perform the procedures and steps corresponding to the terminal device in the method 800.

The transceiver 1520 is configured to receive a request message from a network device, where the request message is used to request a media access control MAC address associated with the apparatus. The transceiver 1520 is further configured to send the MAC address to the network device.

In another possible implementation, the apparatus 1500 is configured to perform the procedures and steps corresponding to the network device in the method 800.

The transceiver 1520 is configured to send a request message to a terminal device, where the request message is used to request a media access control MAC address associated with the terminal device. The transceiver 1520 is further configured to receive the MAC address from the terminal device.

It should be understood that the apparatus 1500 herein is presented in a form of a function unit. The term "unit" herein may refer to an application-specific integrated circuit (ASIC), an electronic circuit, a processor (for example, a shared processor, a special purpose processor, or a group processor) configured to execute one or more software or firmware programs, a memory, a merge logic circuit, and/or another suitable component that supports the described function. In an optional example, a person skilled in the art may understand that the apparatus 1400 may be specifically the terminal device or the network device (respectively used as a transmit end or a receive end) in the foregoing embodiments, and the apparatus 1400 may be configured to perform the procedures and/or steps corresponding to the terminal device or the network device in the foregoing method embodiments. To avoid repetition, details are not described herein again.

The apparatus 1400 in each of the foregoing solutions has functions of implementing the corresponding steps performed by the terminal device or the network device (respectively used as a transmit end or a receive end) in the foregoing methods. The function may be implemented by hardware, or may be implemented by hardware by executing corresponding software. The hardware or the software includes one or more modules corresponding to the foregoing functions. For example, a sending unit may be replaced with a transmitter, a receiving unit may be replaced with a receiver, and another unit such as the determining unit may be replaced with a processor, to respectively perform a sending operation, a receiving operation, and a related processing operation in the method embodiments.

In this embodiment of this application, the apparatus in FIG. 14 may alternatively be a chip or a chip system, for example, a system on chip (SoC). Correspondingly, the receiving unit and the sending unit may be a transceiver circuit of the chip. This is not limited herein.

FIG. 15 shows another apparatus 1500 used for Ethernet data according to an embodiment of this application. The apparatus 1500 includes a processor 1510, a transceiver 1520, and a memory 1530. The processor 1510, the transceiver 1520, and the memory 1530 communicate with each other through an internal connection path. The memory 1530 is configured to store an instruction. The processor 1510 is configured to execute the instruction stored in the memory 1530, to control the transceiver 1520 to send a signal and/or receive a signal.

In a possible implementation, the apparatus 1500 is configured to perform the procedures and steps corresponding to the terminal device in the method 200.

The transceiver 1520 is configured to receive compression configuration information from a network device, where the compression configuration information is used to indicate a parameter of a first Ethernet compression capability. The processor 1510 is configured to generate a first Ethernet packet based on the parameter of the first Ethernet compression capability. The transceiver 1520 is further configured to send the first Ethernet packet to the network device.

In another possible implementation, the apparatus 1500 is configured to perform the procedures and steps corresponding to the network device in the method 200.

The transceiver 1520 is configured to send compression configuration information to a terminal device, where the compression configuration information is used to indicate a parameter of a first Ethernet compression capability; and receive a first Ethernet packet, where the first Ethernet packet is generated based on the parameter of the first Ethernet compression capability. The processor 1510 is configured to decompress the first Ethernet packet.

In another possible implementation, the apparatus 1500 is configured to perform the procedures and steps corresponding to the terminal device in the method 300.

The transceiver 1520 is configured to receive compression configuration information from a network device, where the compression configuration information is used to indicate a parameter of a third Ethernet compression capability; and receive a third Ethernet packet from the network device, where the third Ethernet packet is generated based on the parameter of the third Ethernet compression capability. The processor 1510 is configured to decompress the third Ethernet packet.

In another possible implementation, the apparatus 1500 is configured to perform the procedures and steps corresponding to the network device in the method 300.

The transceiver 1520 is configured to send compression configuration information to a terminal device, where the compression configuration information is used to indicate a parameter of a third Ethernet compression capability. The processor 1510 is configured to generate a third Ethernet packet based on the parameter of the third Ethernet compression capability. The transceiver 1520 is further configured to send the third Ethernet packet to the terminal device.

In another possible implementation, the apparatus 1500 is configured to perform the procedures and steps corresponding to the transmit end in the method 400.

The processor 1510 is configured to generate a fifth Ethernet packet, where the fifth Ethernet packet includes a fifth header, the fifth header includes a fifth context identifier, and the fifth context identifier is used to identify fifth context information. The transceiver 1520 is configured to send the fifth Ethernet packet to a receive end.

In another possible implementation, the apparatus 1500 is configured to perform the procedures and steps corresponding to the receive end in the method 400.

The transceiver 1520 is configured to receive a fifth Ethernet packet, where the fifth Ethernet packet includes a fifth header, the fifth header includes a fifth context identifier, and the fifth context identifier is used to identify fifth context information. The processor 1510 is configured to obtain the fifth context information based on the fifth context identifier. The processor 1510 is further configured to decompress the fifth Ethernet packet based on the fifth context information.

In another possible implementation, the apparatus 1500 is configured to perform the procedures and steps corresponding to the terminal device in the method 300.

The transceiver 1520 is configured to receive downlink control information DCI from a network device, where the DCI is scrambled by using a first radio network temporary identifier RNTI, the first RNTI is an RNTI for an Ethernet packet, and the DCI includes information used to indicate a time-frequency resource carrying the Ethernet packet. The transceiver 1520 is further configured to receive the Ethernet packet from the network device on the time-frequency resource indicated by the DCI.

In another possible implementation, the apparatus 1500 is configured to perform the procedures and steps corresponding to the network device in the method 300.

The transceiver 1520 is configured to send downlink control information DCI to a terminal device, where the DCI is scrambled by using a first radio network temporary identifier RNTI, the first RNTI is an RNTI for an Ethernet packet, and the DCI includes information used to indicate a time-frequency resource carrying the Ethernet packet. The transceiver 1520 is further configured to send the Ethernet packet to the terminal device on the time-frequency resource.

In another possible implementation, the apparatus 1500 is configured to perform the procedures and steps corresponding to the terminal device in the method 300.

The transceiver 1520 is configured to receive a system information block SIB from a network device, where the SIB includes an Ethernet packet. The processor 1510 is configured to obtain the Ethernet packet from the SIB.

In another possible implementation, the apparatus 1500 is configured to perform the procedures and steps corresponding to the network device in the method 300.

The processor 1510 is configured to generate a system information block SIB, where the SIB includes an Ethernet packet. The transceiver 1520 is configured to send the SIB.

In another possible implementation, the apparatus 1500 is configured to perform the procedures and steps corresponding to the terminal device in the method 400.

The transceiver 1520 is configured to receive a request message from a network device, where the request message is used to request a media access control MAC address associated with the apparatus. The transceiver 1520 is further configured to send the MAC address to the network device.

In another possible implementation, the apparatus 1500 is configured to perform the procedures and steps corresponding to the network device in the method 400.

The transceiver 1520 is configured to send a request message to a terminal device, where the request message is used to request a media access control MAC address associated with the terminal device. The transceiver 1520 is further configured to receive the MAC address from the terminal device.

In another possible implementation, the apparatus 1500 is configured to perform the procedures and steps corresponding to the terminal device in the method 400.

The transceiver 1520 is configured to: when a media access control MAC address associated with the apparatus changes, send a changed MAC address to a network device.

It should be understood that the apparatus 1500 may be specifically the terminal device or the network device (respectively used as a transmit end or a receive end) in the foregoing embodiments, and may be configured to perform the steps and/or procedures corresponding to the terminal device or the network device in the foregoing method embodiments. Optionally, the memory 1530 may include a read-only memory and a random access memory, and provide an instruction and data to the processor. A part of the memory may further include a nonvolatile random access memory. For example, the memory may further store information about a device type. The processor 1510 may be configured to execute the instruction stored in the memory, and when executing the instruction stored in the memory, the processor 1510 is configured to perform the steps and/or procedures corresponding to the terminal device or the network device in the method embodiments.

It should be understood that in the embodiments of this application, the processor in the foregoing apparatus may be a central processing unit (CPU), or the processor may be another general purpose processor, a digital signal processor (DSP), an application-specific integrated circuit (ASIC), a field programmable gate array (FPGA) or another programmable logic device, a discrete gate or a transistor logic device, a discrete hardware component, or the like. The general-purpose processor may be a microprocessor, or the processor may be any conventional processor or the like.

In an implementation process, steps in the foregoing methods can be implemented by using a hardware integrated logic circuit in the processor, or by using instructions in a form of software. The steps of the method disclosed with reference to the embodiments of this application may be directly performed by a hardware processor, or may be performed by using a combination of hardware in the processor and a software unit. A software unit may be located in a mature storage medium in the art, such as a random access memory, a flash memory, a read-only memory, a programmable read-only memory, an electrically erasable programmable memory, or a register. The storage medium is located in the memory, and the processor executes the instructions in the memory and completes the steps in the foregoing method in combination with the hardware of the processor. To avoid repetition, details are not described herein again.

In this application, "at least one" means one or more, and "a plurality of" means two or more. The term "and/or" describes an association relationship between associated objects and may indicate three relationships. For example, A and/or B may indicate the following cases: Only A exists, both A and B exist, and only B exists, where A and B may be singular or plural. The character "/" generally indicates an "or" relationship between the associated objects. "At least one of the following" or a similar expression indicates any combination of the items, and includes any combination of singular items or plural items. For example, at least one of a, b, or c may indicate: a, b, c, a and b, a and c, b and c, or a, b, and c, where a, b, and c may be singular or plural.

A person of ordinary skill in the art may be aware that, method steps and units described in the embodiments disclosed in this specification may be implemented by electronic hardware, computer software, or a combination thereof. To clearly describe interchangeability between the hardware and the software, the foregoing has generally described steps and compositions of each embodiment according to functions. Whether the functions are performed by hardware or software depends on particular applications and design constraint conditions of the technical solutions. A person of ordinary skill in the art may use different methods to implement the described functions for each particular application, but it should not be considered that the implementation goes beyond the scope of this application.

A person skilled in the art may clearly understand that, for the purpose of convenient and brief description, for detailed working processes of the foregoing system, apparatus, and unit, refer to corresponding processes in the foregoing method embodiments, and details are not described herein again.

In the several embodiments provided in this application, it should be understood that the disclosed system, apparatus, and method may be implemented in other manners. For example, the described apparatus embodiments are merely examples. For example, division into the units is merely logical function division. There may be another division manner in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electrical, mechanical, or another form.

The units described as separate parts may or may not be physically separate, and parts displayed as units may or may not be physical units, may be located in one location, or may be distributed on a plurality of network units. Some or all of the units may be selected based on actual requirements to achieve the objectives of the solutions of the embodiments in this application.

In addition, functional units in the embodiments of this application may be integrated into one processing unit, or each of the units may exist alone physically, or two or more units are integrated into one unit. The integrated unit may be implemented in the form of hardware, or may be implemented in the form of a software function unit.

When the integrated unit is implemented in the form of a software function unit and sold or used as an independent product, the integrated unit may be stored in a computer-readable storage medium. Based on such an understanding, the technical solutions of this application essentially, or the part contributing to the prior art, or all or some of the technical solutions may be implemented in the form of a software product. The computer software product is stored in a storage medium and includes several instructions for instructing a computer device (which may be a personal computer, a server, or a network device) to perform all or some of the steps of the methods described in the embodiments of this application. The foregoing storage medium includes any medium that can store program code, for example, a USB flash drive, a removable hard disk, a read-only memory (ROM), a random access memory (RAM), a magnetic disk, or an optical disc.

The foregoing descriptions are merely specific embodiments of this application, but are not intended to limit the protection scope of this application. Any modification or replacement readily figured out by a person skilled in the art within the technical scope disclosed in this application shall fall within the protection scope of this application. Therefore, the protection scope of this application shall be subject to the protection scope of the claims.

What is claimed is:

1. A communication method performed by a terminal device, wherein the method comprises:
receiving compression configuration information from a network device, wherein the compression configuration information enables the terminal device to activate a first Ethernet compression capability;
sending an uncompressed Ethernet packet to the network device, wherein the uncompressed Ethernet packet comprises a first header, the first header comprises a first correspondence between a first context identifier and first context information, wherein the first context information comprises a destination media access control (MAC) address and a source MAC address;
receiving first feedback information from the network device, wherein the first feedback information indicates that the network device successfully receives the first correspondence;
generating a compressed Ethernet packet based on the compression configuration information, wherein the compressed Ethernet packet comprises a second header, the second header comprises the first context identifier but does not comprise the first context information; and
sending the compressed Ethernet packet to the network device.

2. The method according to claim 1, wherein the first context identifier is used to identify the first context information.

3. The method according to claim 2, wherein the second header comprises a field indicating whether the compressed Ethernet packet is a compressed packet.

4. The method according to claim 1, wherein the first header comprises the first context identifier and the first context information.

5. The method according to claim 1, wherein the method further comprises:
reporting, to the network device, a capability whether the terminal device supports both robust header compression (ROHC) and Ethernet header compression.

6. The method according to claim 1, wherein the receiving the first feedback information from the network device, further comprises:
receiving a feedback packet including a feedback header and a feedback payload, wherein the feedback header includes: (1) a field used to indicate whether the feedback packet contains data or control information, (2) a type field used to indicate feedback information for Ethernet compression, and (3) a reserved field, and wherein the feedback payload carries the first feedback information.

7. The method according to claim 1, wherein the compression configuration information is configured at a bearer granularity.

8. An apparatus, wherein the apparatus comprises:
a memory; and
one or more processors coupled to the memory, wherein the one or more processors configure the apparatus to:
receive compression configuration information from a network device, wherein the compression configuration information enables the apparatus to activate a first Ethernet compression capability;
send an uncompressed Ethernet packet to the network device, wherein the uncompressed Ethernet packet comprises a first header, the first header comprises a first correspondence between a first context identifier and first context information, wherein the first context information comprises a destination media access control (MAC) address and a source MAC address;

receive first feedback information from the network device, wherein the first feedback information indicates that the network device successfully receives the first correspondence;

generate a compressed Ethernet packet based on the compression configuration information, wherein the compressed Ethernet packet comprises a second header, the second header comprises the first context identifier but does not comprise the first context information; and send the compressed Ethernet packet to the network device.

9. The apparatus according to claim 8, wherein the first context identifier is used to identify the first context information.

10. The apparatus according to claim 9, wherein the second header comprises a field indicating whether the compressed Ethernet packet is a compressed packet.

11. The apparatus according to claim 8, wherein the first header comprises the first context identifier and the first context information.

12. The apparatus according to claim 8, wherein the one or more processors further configure the apparatus to:

report, to the network device, a capability whether the apparatus supports both robust header compression (ROHC) and Ethernet header compression.

13. The apparatus according to claim 8, wherein the one or more processors further configure the apparatus to:

receive a feedback packet including a feedback header and a feedback payload, wherein the feedback header includes: (1) a field used to indicate whether the feedback packet contains data or control information, (2) a type field used to indicate feedback information for Ethernet compression, and (3) a reserved field, and wherein the feedback payload carries the first feedback information.

14. The apparatus according to claim 8, wherein the compression configuration information is configured at a bearer granularity.

15. An apparatus, wherein the apparatus comprises:
a memory; and
one or more processors coupled to the memory, wherein the one or more processors configure the apparatus to:
send compression configuration information to a terminal device, wherein the compression configuration information enables the terminal device to activate a first Ethernet compression capability;

receive an uncompressed Ethernet packet from the terminal device, wherein the uncompressed Ethernet packet comprises a first header, the first header comprises a first correspondence between a first context identifier and first context information, wherein the first context information comprises a destination media access control (MAC) address and a source MAC address;

send first feedback information to the terminal device, wherein the first feedback information indicates that the apparatus successfully receives the first correspondence;

receive a compressed Ethernet packet from the terminal device, wherein the compressed Ethernet packet comprises a second header, the second header comprises the first context identifier but does not comprise the first context information, wherein the compressed Ethernet packet is generated based on the compression configuration information; and decompress the compressed Ethernet packet.

16. The apparatus according to claim 15, wherein the first context identifier is used to identify the first context information.

17. The apparatus according to claim 16, wherein the second header comprises a field indicating whether the compressed Ethernet packet is a compressed packet.

18. The apparatus according to claim 15, wherein the one or more processors further configure the apparatus to:

receive, from the terminal device, a capability whether the terminal device supports both robust header compression (ROHC) and Ethernet header compression.

19. The apparatus according to claim 15, wherein the one or more processors further configure the apparatus to:

receive a feedback packet including a feedback header and a feedback payload, wherein the feedback header includes: (1) a field used to indicate whether the feedback packet contains data or control information, (2) a type field used to indicate feedback information for Ethernet compression, and (3) a reserved field, and wherein the feedback payload carries the first feedback information.

20. The apparatus according to claim 15, wherein the compression configuration information is configured at a bearer granularity.

* * * * *